(12) United States Patent
Ragnarsson

(10) Patent No.: US 11,054,134 B2
(45) Date of Patent: Jul. 6, 2021

(54) PORTABLE COMBUSTION/PYROLIZATION SYSTEM WITH FIRST AND SECOND AIR SOURCES

(71) Applicant: RAGNAR ORIGINAL INNOVATION, INC., Hooksett, NH (US)

(72) Inventor: Anders Ragnarsson, Chester, NH (US)

(73) Assignee: TIGERCAT INDUSTRIES INC., Brantford (CA)

( * ) Notice: Subject to any disclaimer, the term of this patent is extended or adjusted under 35 U.S.C. 154(b) by 105 days.

(21) Appl. No.: 16/384,275

(22) Filed: Apr. 15, 2019

(65) Prior Publication Data
US 2019/0316772 A1 Oct. 17, 2019

Related U.S. Application Data

(60) Provisional application No. 62/658,207, filed on Apr. 16, 2018.

(51) Int. Cl.
*F23G 5/40* (2006.01)
*F23G 7/10* (2006.01)
(Continued)

(52) U.S. Cl.
CPC ............. *F23G 5/40* (2013.01); *F23G 7/105* (2013.01); *F23G 5/34* (2013.01); *F23L 9/02* (2013.01)

(58) Field of Classification Search
CPC .......... F23G 5/40; F23G 5/42; F23G 2203/60; F23G 2203/601
See application file for complete search history.

(56) References Cited

U.S. PATENT DOCUMENTS

| 991,885 | A | * | 5/1911 | Pomeroy | F23B 5/00 110/305 |
| 996,249 | A | * | 6/1911 | Hudson | F23L 1/00 110/309 |

(Continued)

OTHER PUBLICATIONS

Written Opinion filed in corresponding PCT Application No. PCT/US2019/027482 dated Jun. 25, 2019.
(Continued)

*Primary Examiner* — David J Laux
(74) *Attorney, Agent, or Firm* — Finch & Maloney, PLLC; Michael J. Bujold

(57) ABSTRACT

A combustion/pyrolization system comprising a combustion/pyrolization chamber supported by the base frame, and a perforated grate forms a bottom surface of the combustion/pyrolization chamber and facilitates passage of char and boichar therethrough. The combustion/pyrolization chamber is open along at a top and an air manifold supplies a first source of combustion air across the top of the combustion/pyrolization chamber to form an air curtain. A char collection/transfer chamber is located below the perforated grate for collecting at least the char and boichar that passes therethrough, and a conveying mechanism transfers the char and boichar out of the combustion/pyrolization system for collection and use. An air plenum chamber cools the char collection/transfer chamber such that the supplied secondary air becomes heated, and the heated secondary air flows into the char collection/transfer chamber and through the perforated grate into the combustion/pyrolization chamber to provide secondary combustion air.

15 Claims, 12 Drawing Sheets

(51) Int. Cl.
*F23G 5/34* (2006.01)
*F23L 9/02* (2006.01)

(56) References Cited

U.S. PATENT DOCUMENTS

| | | | | | |
|---|---|---|---|---|---|
| 1,066,043 | A | * | 7/1913 | Parsons | F23L 1/02 110/202 |
| 1,687,784 | A | * | 10/1928 | Peek | F23B 60/00 122/225 F |
| 2,283,631 | A | * | 5/1942 | Hoffman | F23L 1/00 110/190 |
| 3,601,069 | A | * | 8/1971 | Mancuso | F23G 5/16 110/190 |
| 3,859,934 | A | * | 1/1975 | Weholt | F23G 5/40 110/203 |
| 4,246,850 | A | * | 1/1981 | Gravel | F23J 15/06 110/203 |
| 4,452,611 | A | * | 6/1984 | Richey | C10J 3/26 110/229 |
| 4,756,258 | A | * | 7/1988 | Gilbert | F23G 5/34 110/235 |
| 4,829,913 | A | * | 5/1989 | Priebe | F23G 5/00 110/238 |
| 4,917,026 | A | * | 4/1990 | Greenough | F23G 5/00 110/297 |
| 4,987,837 | A | * | 1/1991 | Reschly | F23G 5/002 110/110 |
| 5,050,509 | A | * | 9/1991 | Mormino | F23G 5/00 110/235 |
| 5,086,714 | A | * | 2/1992 | Hladun | F23H 9/04 110/165 A |
| 5,279,234 | A | * | 1/1994 | Bender | F23G 5/027 110/101 C |
| 5,415,113 | A | * | 5/1995 | Wheeler | F23G 7/105 110/241 |
| 5,660,125 | A | * | 8/1997 | Tanca | F23C 6/045 110/345 |
| 5,706,090 | A | * | 1/1998 | Jokinen | F27D 21/0021 356/394 |
| 5,741,130 | A | * | 4/1998 | Hagstrom | F23J 3/00 110/212 |
| 6,962,118 | B1 | * | 11/2005 | Shimono | F23G 5/027 110/211 |
| 7,063,027 | B2 | * | 6/2006 | O'Connor | F23G 5/12 110/185 |
| 7,146,915 | B2 | * | 12/2006 | Magaldi | F23J 1/02 110/165 R |
| 7,241,322 | B2 | * | 7/2007 | Graham | C10J 3/34 48/111 |
| 7,503,268 | B2 | * | 3/2009 | O'Connor | F23G 5/40 110/240 |
| 8,311,777 | B2 | * | 11/2012 | Sugiura | G01B 11/25 702/187 |
| 9,242,523 | B2 | * | 1/2016 | Teppig, Jr. | B60F 3/0015 |
| 9,534,510 | B2 | * | 1/2017 | Kerr | F23G 5/0276 |
| 9,604,679 | B2 | * | 3/2017 | Steben | B62D 55/14 |
| 9,709,266 | B2 | * | 7/2017 | Aldrich | F23G 7/085 |
| 2006/0090676 | A1 | * | 5/2006 | Puth | F23G 1/00 110/194 |
| 2007/0144412 | A1 | * | 6/2007 | O'Connor | F23G 5/40 110/241 |
| 2008/0110448 | A1 | * | 5/2008 | Gross | F23B 40/08 126/73 |
| 2012/0137582 | A1 | * | 6/2012 | Graham | F23G 7/12 48/87 |
| 2012/0235423 | A1 | * | 9/2012 | O'Connor | F23G 5/46 290/1 R |
| 2013/0276723 | A1 | * | 10/2013 | Higgins | F22B 21/14 122/235.12 |
| 2013/0284079 | A1 | * | 10/2013 | Magaldi | F23J 1/02 110/165 R |
| 2016/0076774 | A1 | * | 3/2016 | DeFoort | F24B 5/028 110/345 |

OTHER PUBLICATIONS

International Search Report filed in corresponding PCT Application No. PCT/US2019/027482 dated Jun. 25, 2019.

* cited by examiner

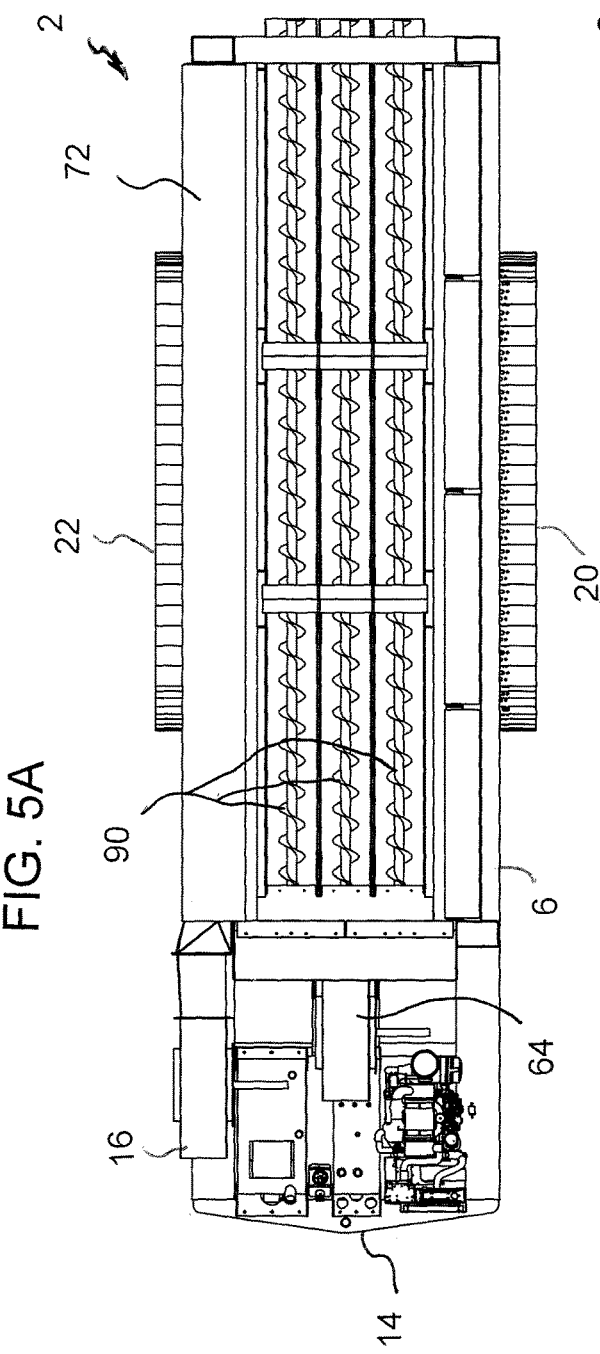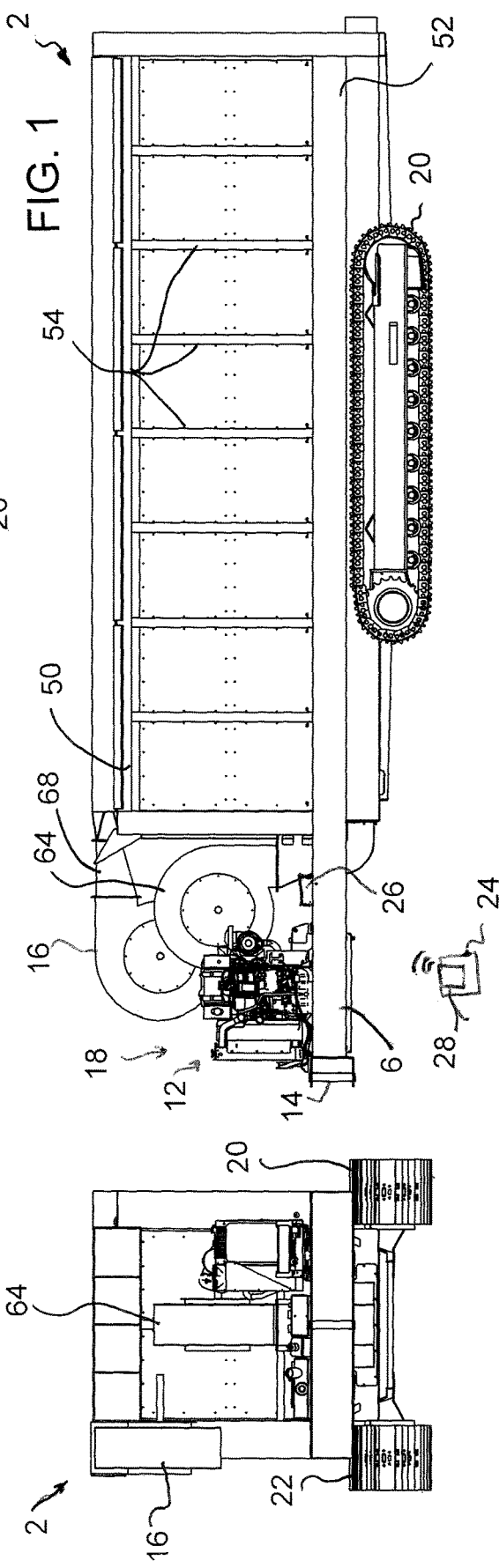

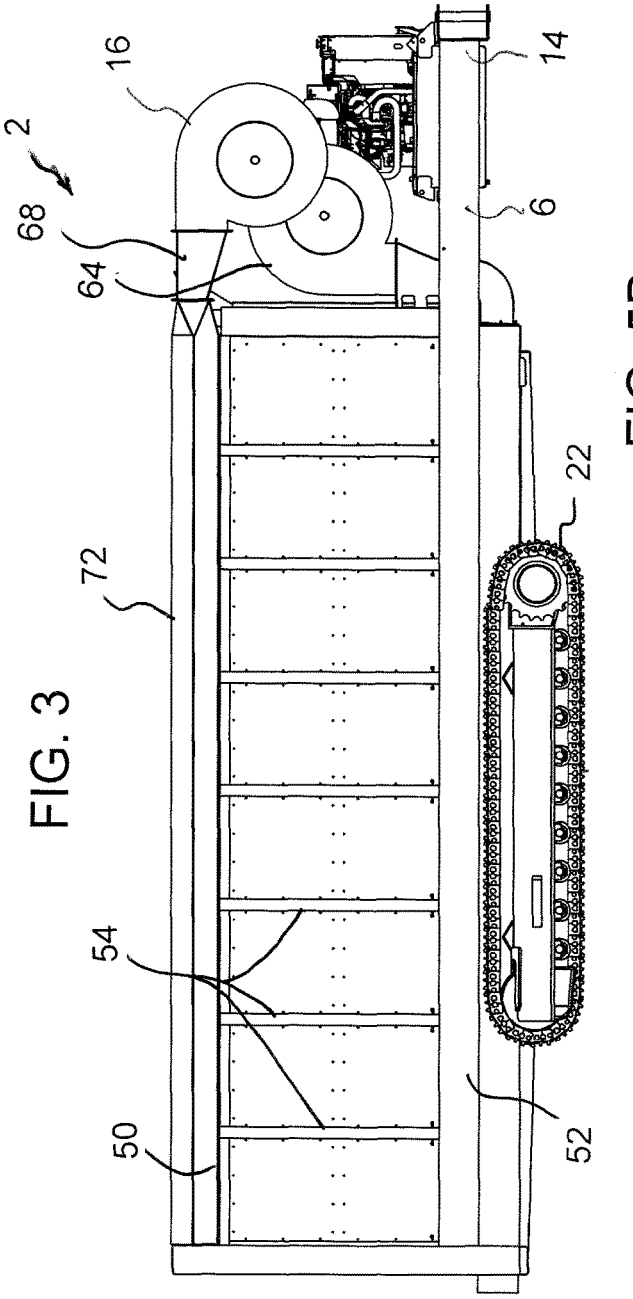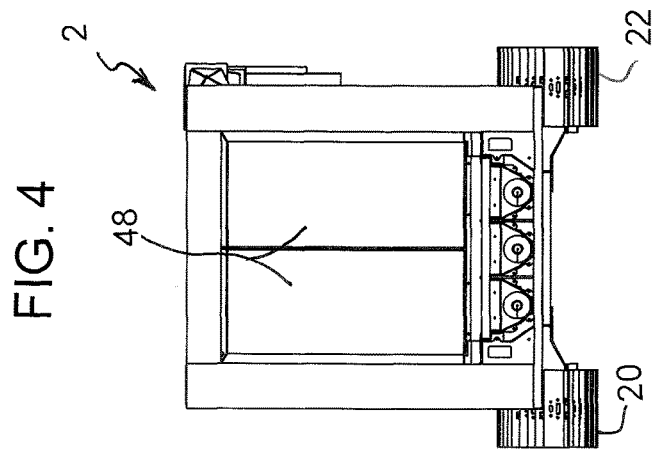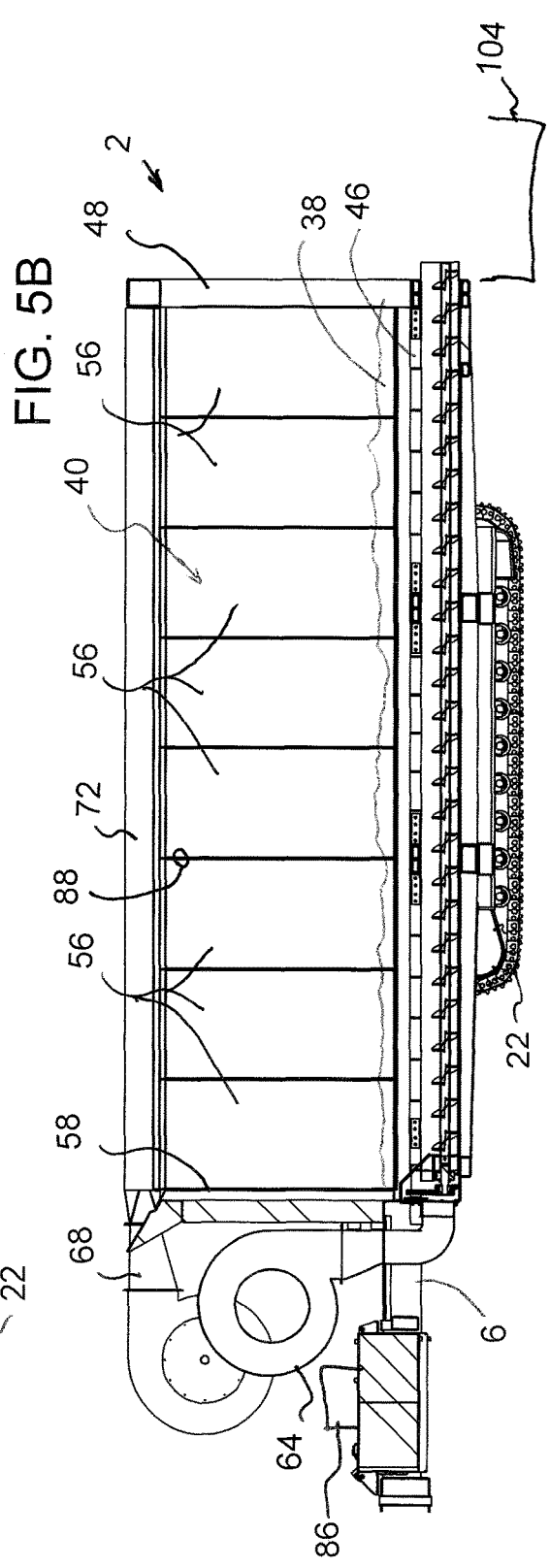

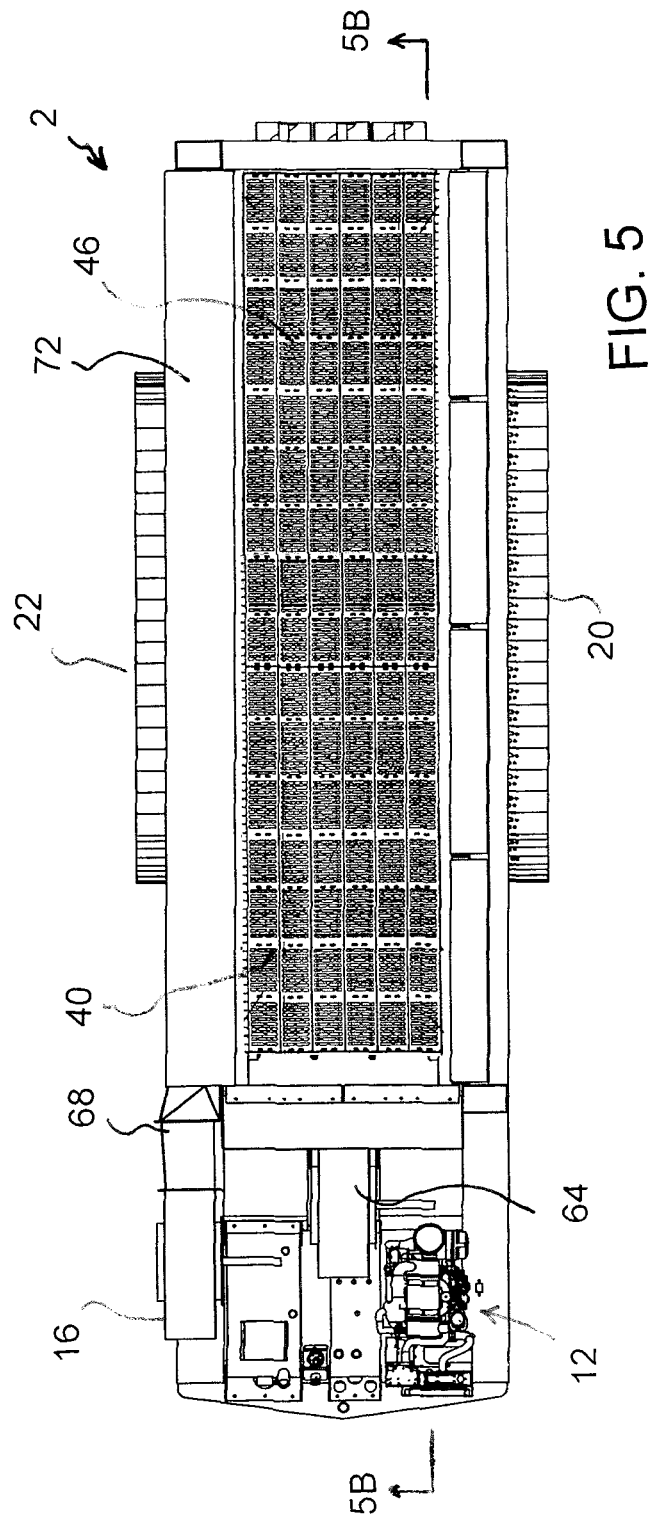

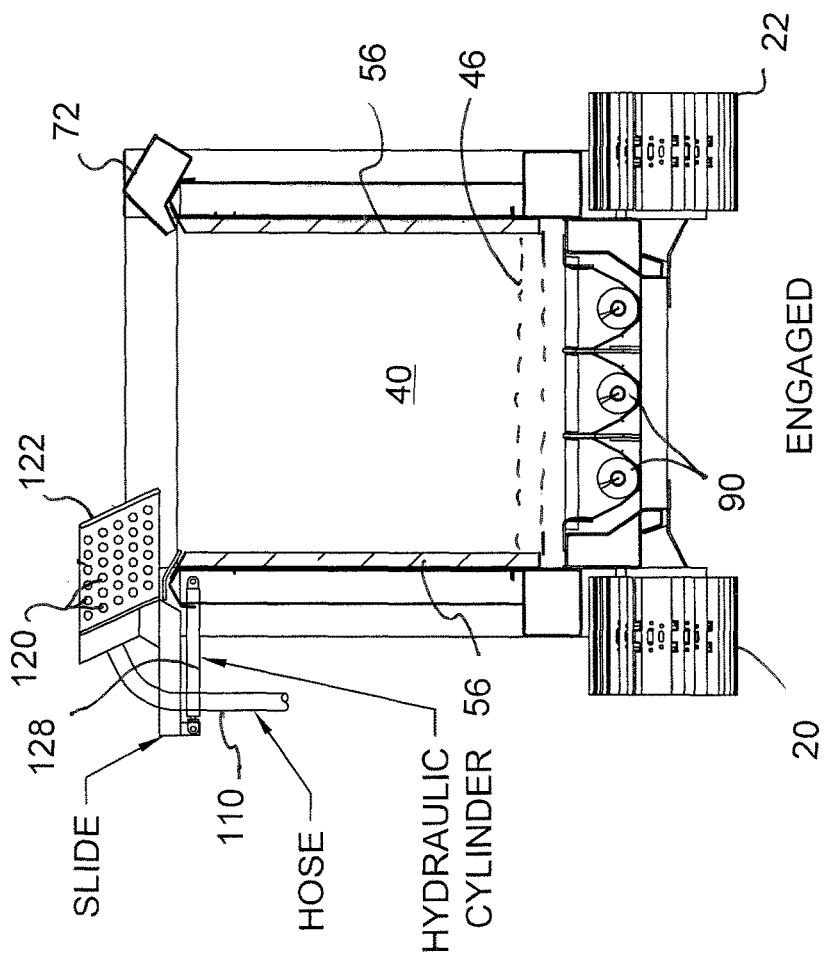
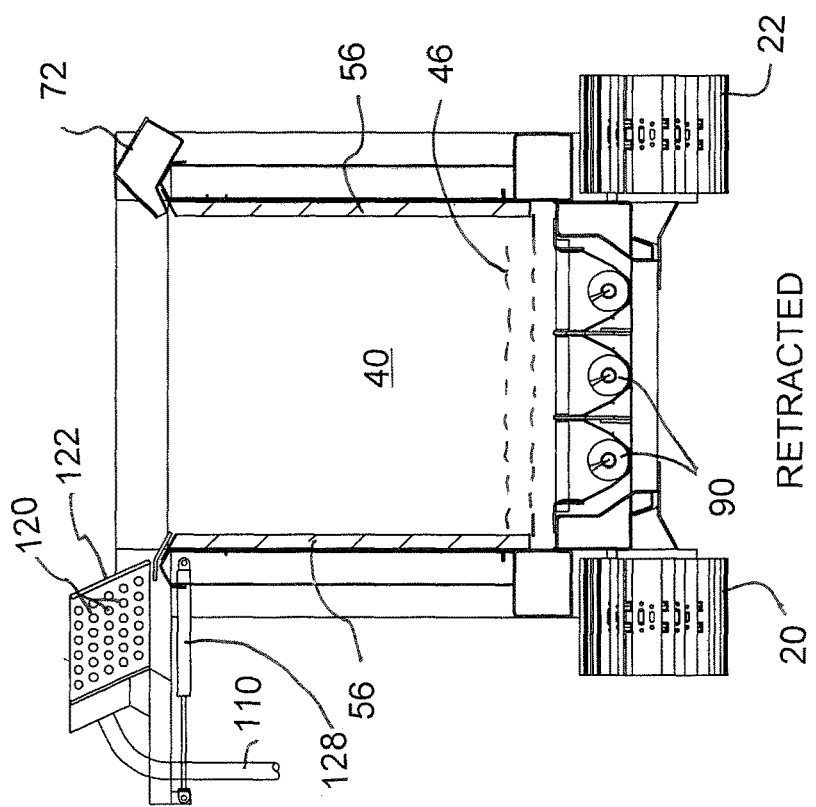

PORTABLE COMBUSTION/PYROLIZATION SYSTEM WITH FIRST AND SECOND AIR SOURCES

FIELD OF THE INVENTION

The present invention relates to a portable pyrolization system provided which can readily be transported or repositioned to another location at the same job site, or to a new job site, has both first and second sources of aft, and is designed to pyrolize all types of material, such forestry debris, vegetative debris, biomass, processed and unprocessed wood, chips, bark, ground wood and well as other materials such municipal solid waste (MSW), all of which is hereinafter referenced to as "feed material."

BACKGROUND OF THE INVENTION

Vegetative material, in particular wood, has long been a difficult problem for community landfills, lumbering operations and cleanup operations after a natural disaster. Grinding wood reduces its volume, but is relatively expensive and can be harmful to the environment, and, in any event, it still fails to reduce the amount of wood. Moreover, in the context of a massive tree kill, due to insect infestation and/or climate change, for example, the approach of grinding, chipping and hauling the wood does not solve, but can actually spread the problem.

Fireboxes and fire pits have been used to burn vegetative material at clearing sites. In order to reduce ash and smoke released during material incineration (particulate release), a flow of high velocity air has been used to provide an "air curtain" over a fire pit or firebox in which the material is burned. U.S. Pat. Nos. 4,756,258 and 5,415,113 describe portable apparatus for air curtain incineration. The former patent relates to a fan and manifold assembly that can be towed to and positioned at the edge of a fire pit, whereas the latter patent relates to a firebox, fan, and manifold assembly mounted on a support frame for transport to a desired clearing site for incineration of material without the need to dig a fire pit. These portable solutions offer relatively clean burning and also minimize the need to transport the material, however, they both still suffer from a number of associated drawbacks, e.g., the material is completely burnt thereby releasing into the atmosphere the carbon contained in that material.

It is to be appreciated that currently available fireboxes and fire pits are typically costly to move or transport from one job site to another job site. In addition, it is typically tedious and time-consuming to move a firebox or a fire pit from one location, on a job site, to another different location, on the same or a different job site. Lastly, the currently available fireboxes and fire pits typically require either a crane to lift the firebox or fire pit onto a trailer or a very specialized trailer in order to facilitate transport of currently available fireboxes and fire pits from one job site or location to another job site or location. Further, such repositioning often includes required assembly effort and time when arriving at a new job site. This is a serious drawback concerning the currently available fireboxes and fire pits.

Trench burners tend to be somewhat easier to move, along a roadway, from one job site to another job site due their relatively compact size. However, trench burners typically require preparation work to be performed at the job site, such as digging a ditch in order to accommodate the trench burner.

In addition, the currently available trench burners, fireboxes and fire pits do not have any system for automatically removing the char, biochar, ash, clinkers, soot, unburnt debris, etc., which eventually accumulate within the combustion chamber while burning the vegetative material and/or biomass. Accordingly, removal of the char, biochar, ash, clinkers, soot, unburnt debris, etc., tends to be a dirty, cumbersome, tedious, and time-consuming exercise. In addition, since the material remains within the trench burners, fireboxes and fire pits for prolonged periods of time, the material is generally completely burned thereby releasing all of the carbon contained within the material into the atmosphere.

Moreover, the currently available trench burners, fireboxes and fire pits typically lack an adequate supply of combustion air to the combustion chamber, particularly the lower portion of the combustion chamber. This lack of adequate combustion air inhibits efficient combustion, whether to completion or as an initial step in the pyrolysis process, of the vegetative material and/or biomass within conventional burners, fireboxes and fire pits.

Further, the currently available trench burners, fireboxes and fire pits are typically not equipped with any automated or semi-automated ignition system which facilitates igniting the vegetative material and/or biomass contained within the combustion chamber. Accordingly, one typical technique for commencing burning of the vegetative material and/or biomass is to add an excessive amount of an accelerant, such as diesel fuel or some other readily combustible fuel, to the vegetative material and/or biomass and then ignite the accelerant in order to commence combustion of the vegetative material and/or biomass. Such technique is generally an inconvenient way of igniting the vegetative material and/or biomass and may possibly create a potentially dangerous or hazardous situation.

Lastly, it is to be appreciated that the currently available trench burners, fireboxes and fire pits are not equipped with any automated feed mechanism for feeding additional material into the combustion chamber for consumption, as periodically required by the combustion chamber. In addition, none of the currently available trench burners, fireboxes and fire pits have any visual aid which assists an operator of the equipment with viewing combustion of the vegetative material and/or biomass occurring within the combustion chamber.

Even with the recent advances which have occurred in the art, biomass incineration facilities and/or portable apparatuses still suffer from a number of associated drawbacks. Accordingly, there still remains a need for a vegetative material and/or biomass combustion apparatus that can be easily setup at a temporary location and operated until the material transportation costs become too high and, thereafter, the combustion apparatus can be easily moved or relocated to another location, at the same job site or to a new job site, for further use. The poi/able combustion system should not require any fuel(s) to supplement or augment the combustion/pyrolysis process (other than the fuel required to commence ignition of the vegetative material and/or biomass), and the portable combustion system should accept substantially 100% of the vegetative material and/or biomass substantially without the need to process the same before such vegetative material and/or biomass is placed in the combustion chamber for combustion. Lastly, the portable combustion system should be designed to either periodically, or continuously, discharge of char, biochar, ash, clinkers, soot, unburnt debris, etc., from the combustion chamber so as to permit prolonged and/or continuous operation of the portable combustion system before removal of char, biochar, clinkers, ash, soot, unburnt debris, etc., from the combustion chamber is required or necessary.

SUMMARY OF THE INVENTION

Wherefore, it is an object of the disclosure to overcome the above-mentioned shortcomings and drawbacks associated with the prior art incinerator apparatuses.

Another object is to provide a portable combustion/pyrolization system which can combust all types of feed material, e.g., both unprocessed and processed vegetative material and/or biomass, and is readily movable or repositionable from one location to another location, either at the same job site or at a new job site.

A further object is to provide a portable combustion/pyrolization system in which combustion air is supplied to the combustion/pyrolization chamber, both from the top/side of the combustion/pyrolization chamber as well as from the bottom portion of the combustion/pyrolization chamber, in order to increase and promote more efficient combustion/pyrolization of the material contained within the combustion/pyrolization chamber of the portable combustion/pyrolization system.

Yet another object is to preheat at least the secondary source of combustion air, being supplied to the bottom portion of the combustion/pyrolization chamber, prior to that combustion air passing through the perforated grate and entering into the combustion chamber, so as to increase and promote more efficient combustion/pyrolization of the feed material contained within the combustion/pyrolization chamber of the portable combustion/pyrolization system.

A still further object is to provide the portable combustion/pyrolization apparatus with a perforated grate which permits continuous discharge of char, biochar, ash, clinkers, soot, unburnt debris, etc., from the combustion/pyrolization chamber into the char collection/transfer chamber, thereby increasing the duration of time that the portable combustion/pyrolization system can continuously operate before any emptying/servicing of the combustion/pyrolization chamber is required.

A further object is to provide the perforated grate with sufficiently large holes so as to permit sufficiently large particles of char and boichar to pass therethough and fall into the char collection/transfer chamber and thereby avoid the complete combustion of the char and boichar and assist with collection of char and boichar particles having a sufficient carbon content for subsequent use and processing.

Another object is to locate the char collection/transfer chamber vertically below the perforated orate, provided at the bottom of the combustion/pyrolization chamber, in which the char and biochar can be extinguished/quenched so as to discontinue further combustion/pyrolization of the char and boichar and/or convey the char and biochar out of the char collection/transfer chamber for any additional extinguishing or quenching of the char and biochar thereby preserving as much carbon as possible in the generated char and boichar.

Still another object is to supply a heat transfer medium, such as water, into an end of a hollow auger in order to cool the auger shaft and, as the heat transfer medium flows through the auger shaft, openings in the auger shaft assist with distributing the heat transfer medium along the respective trough of the char collection/transfer chamber to extinguish or quench the char, biochar, ash, clinkers, soot, unburnt debris, etc., which pass through the perforated grate and collect within the trough and thereby facilitate generation of char and boichar which has a desired carbon content.

Yet another object is to supply a heat transfer medium, such as water, to a leading end of each one of the troughs of the char collection/transfer chamber which assists with both extinguishing or quenching the char, biochar, ash, clinkers, soot, unburnt debris, etc., as well as assists with or facilitates conveying the char, biochar, ash, clinkers, soot, unburnt debris, etc., along the respective trough and out of the char collection/transfer chamber of the portable combustion apparatus.

A further object is to utilize a secondary source of combustion air, supplied to the bottom portion of the combustion/pyrolization chamber, to cool the char collection/transfer chamber, e.g., the troughs and conveying augers, so that the secondary source of combustion air is preheated prior to that combustion air passing through the perforated grate and entering into the combustion/pyrolization chamber.

Still another object is to provide the portable combustion/pyrolization system with a camera, or some other viewing device, which facilitates viewing by an operator of the combustion/pyrolization process, as it occurs within the combustion/pyrolization chamber, so that the operator can monitor such combustion/pyrolization and determine if a problem exists or when to feed additional material into the combustion/pyrolization chamber.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described by way of example, with reference to the accompanying drawings in which:

FIG. 1 is a diagrammatic right side elevational view of the portable combustion/pyrolization system of the disclosure;

FIG. 2 is a diagrammatic front elevational view of the portable combustion/pyrolization system of FIG. 1.

FIG. 3 is a diagrammatic left side elevational view of the portable combustion/pyrolization system of FIG. 1;

FIG. 4 is a diagrammatic rear elevational view of the portable combustion/pyrolization system of FIG. 1;

FIG. 5 is a diagrammatic top plan view of the portable combustion/pyrolization system of FIG. 1;

FIG. 5A is a diagrammatic top plan view of the portable combustion/pyrolization system of FIG. 1, with the perforated grate removed to show the conveying augers;

FIG. 5B is a diagrammatic cross-sectional view taken along section line 5B-5B of FIG. 5;

Figure 6:
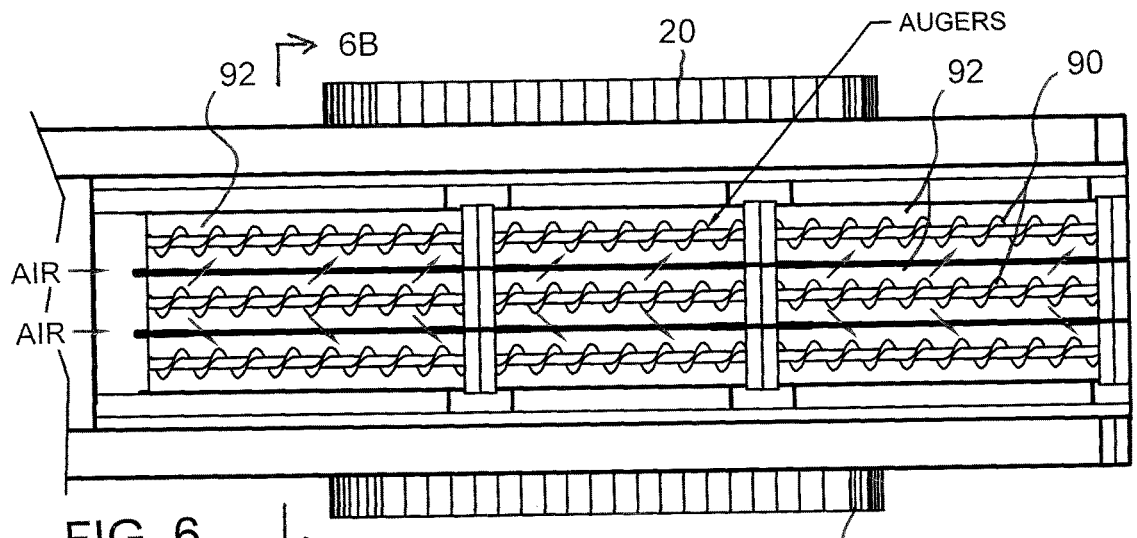
FIG. 6 is a diagrammatic top plan view of the char collection/transfer chamber diagrammatically showing the flow of the secondary air, in dashed lines, flowing within an air plenum chamber located below the char collection/transfer chamber.
Figure 7:
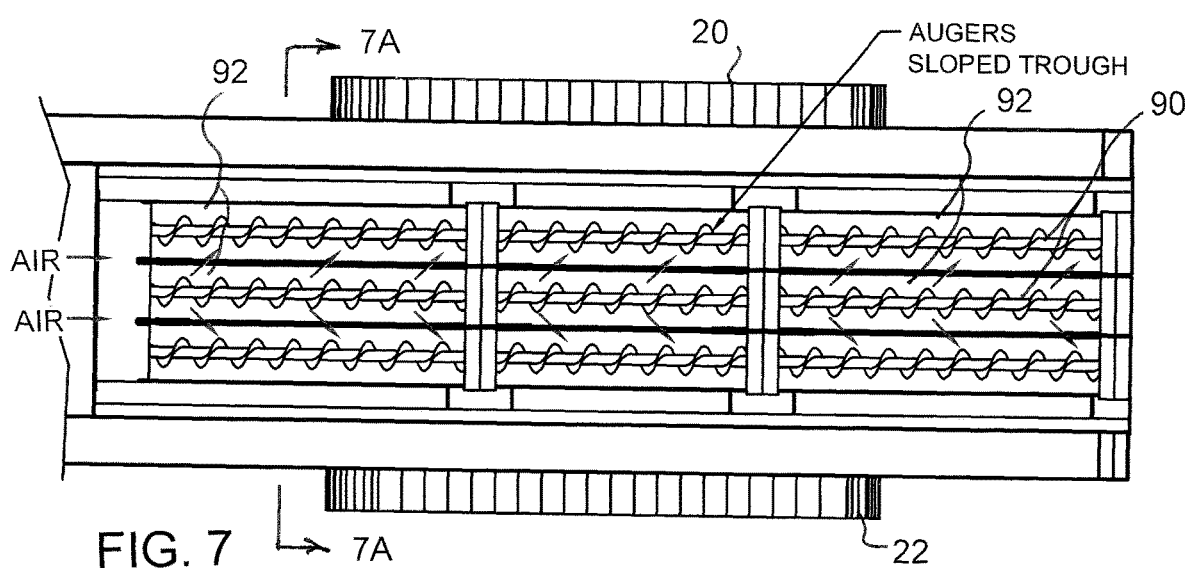
FIG. 7 is a diagrammatic top plan view of the char collection/transfer chamber diagrammatically showing the flow of the secondary air, in dashed lines, flowing within the air plenum chamber located below the char collection/ transfer Chamber and a heat conductive medium being supplied to the leading end of each trough for both quenching the char and boichar and assisting with conveying of the same.
Figure 8:
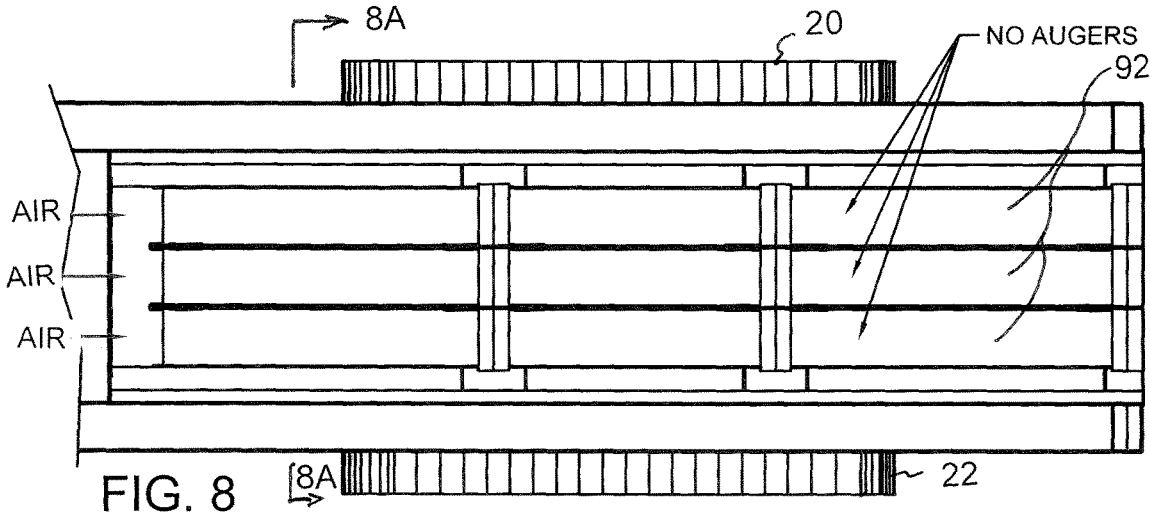
Figure 7A:
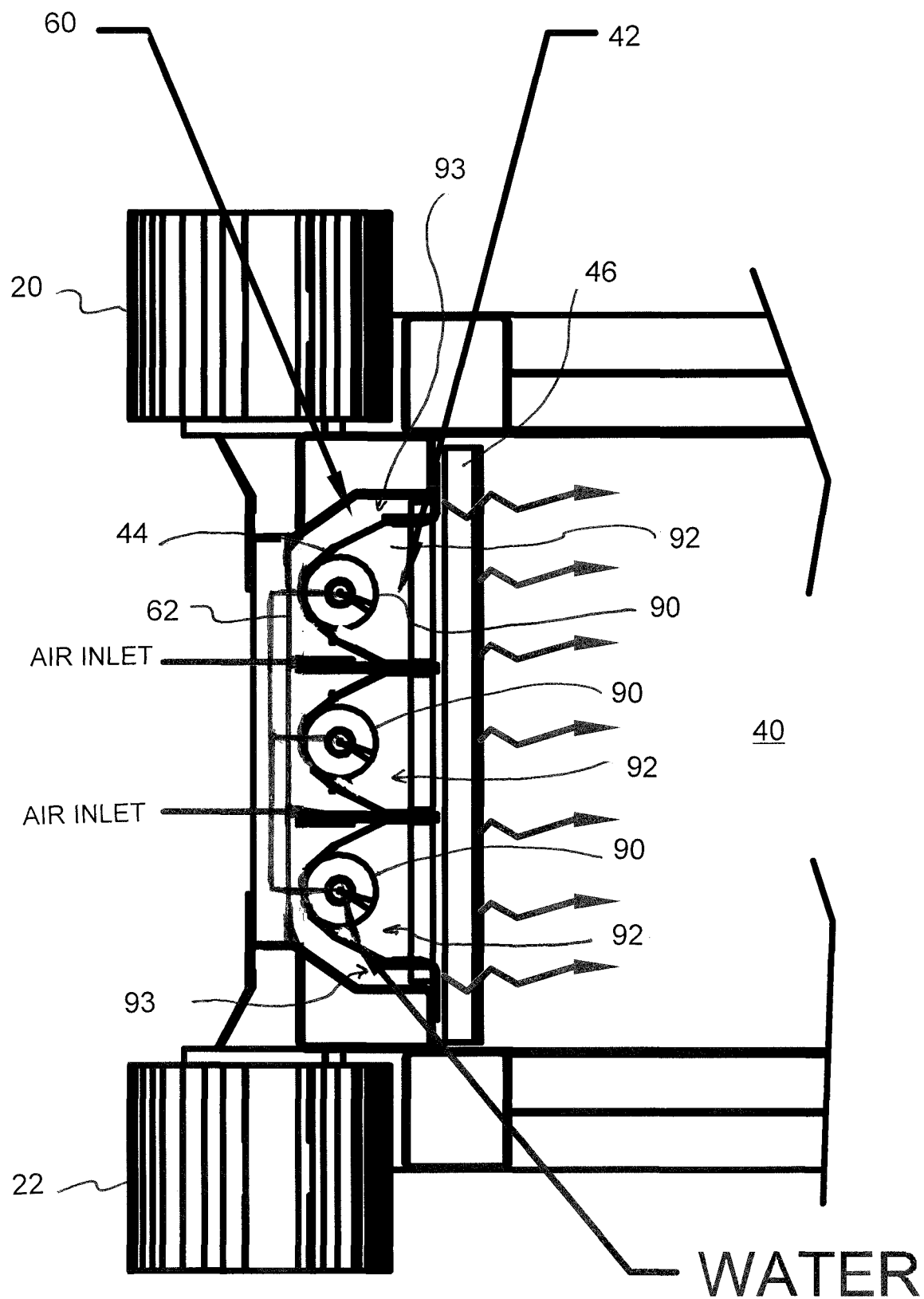
Figure 8A:
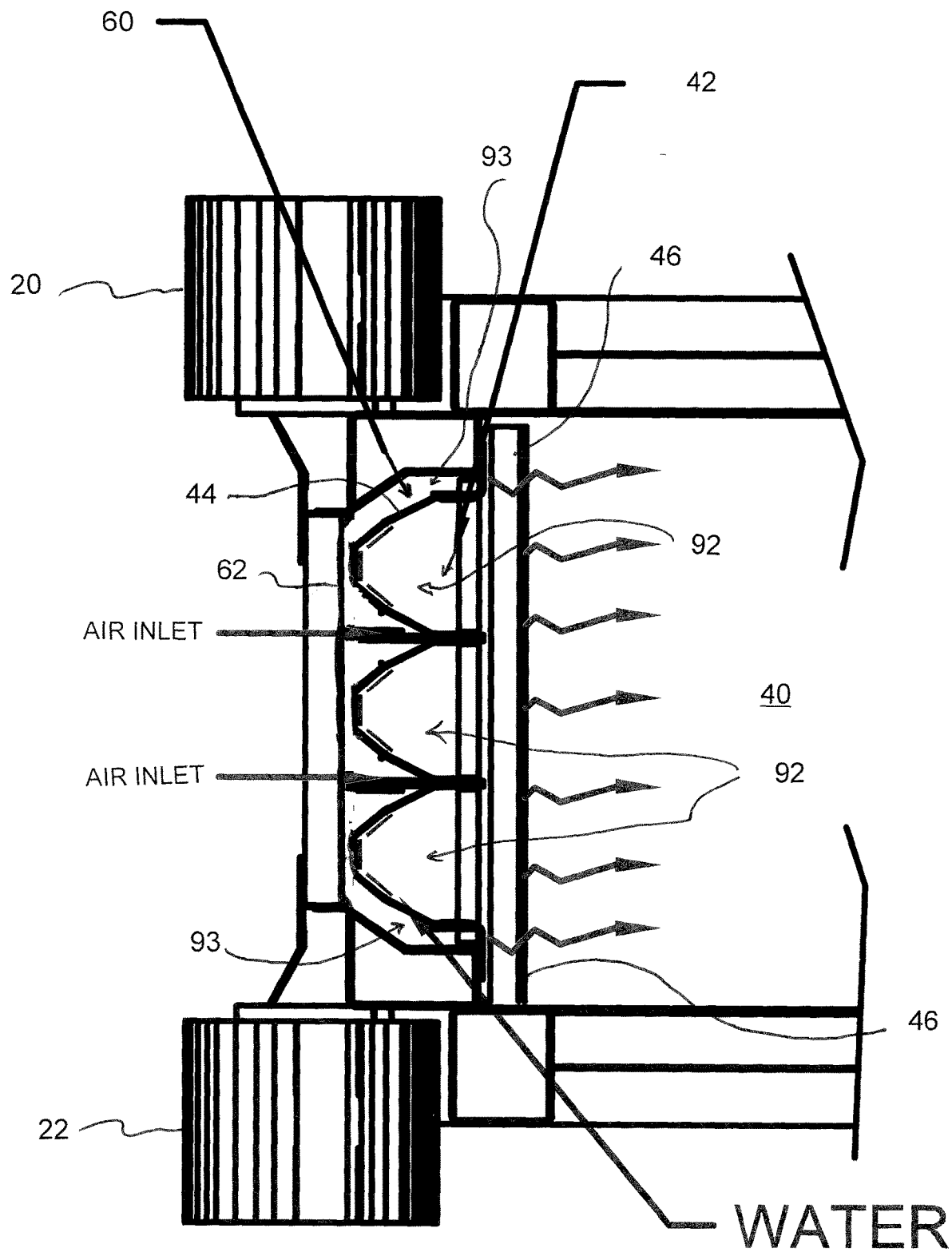
Figure 9:
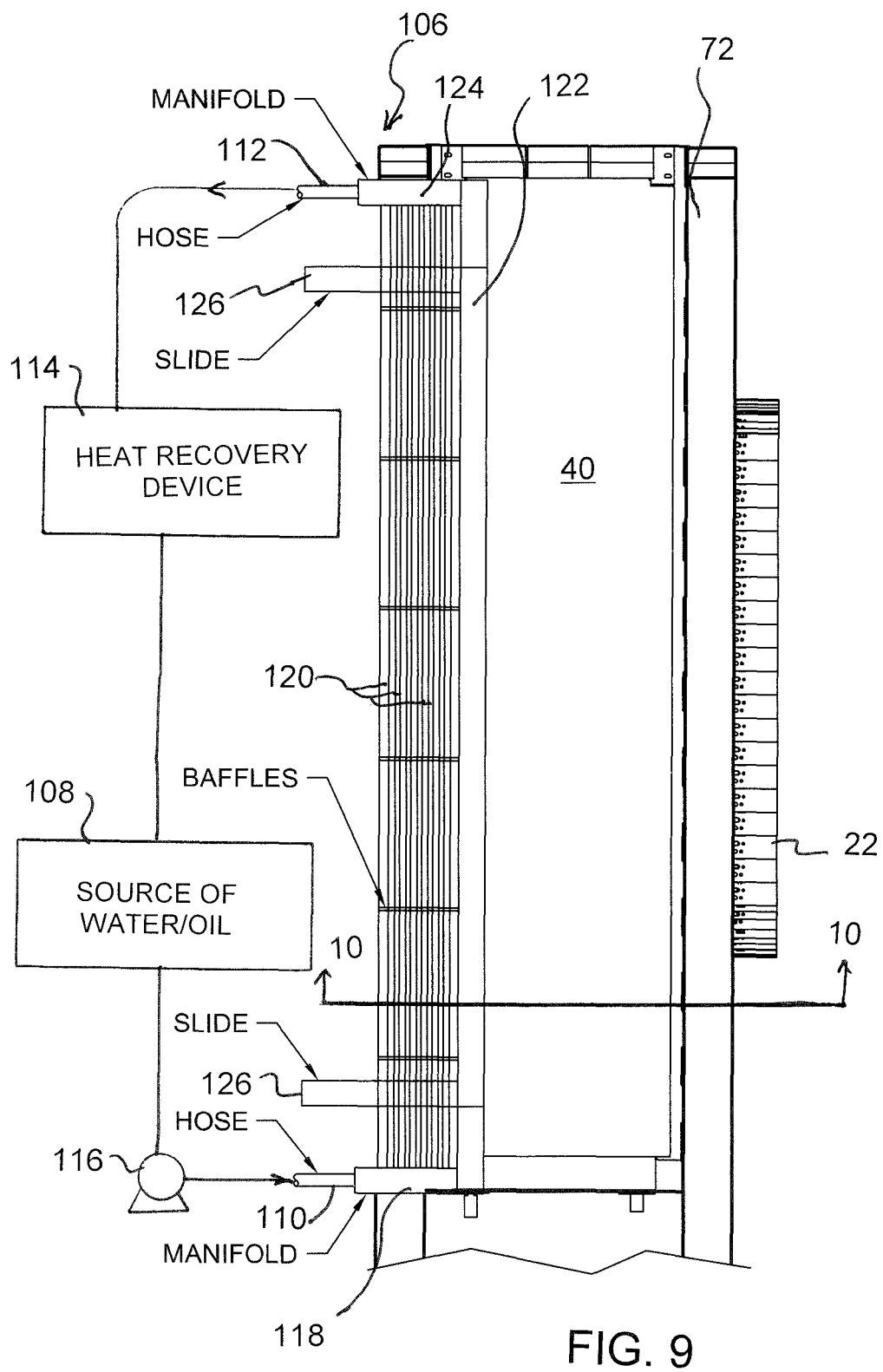
Figure 12:
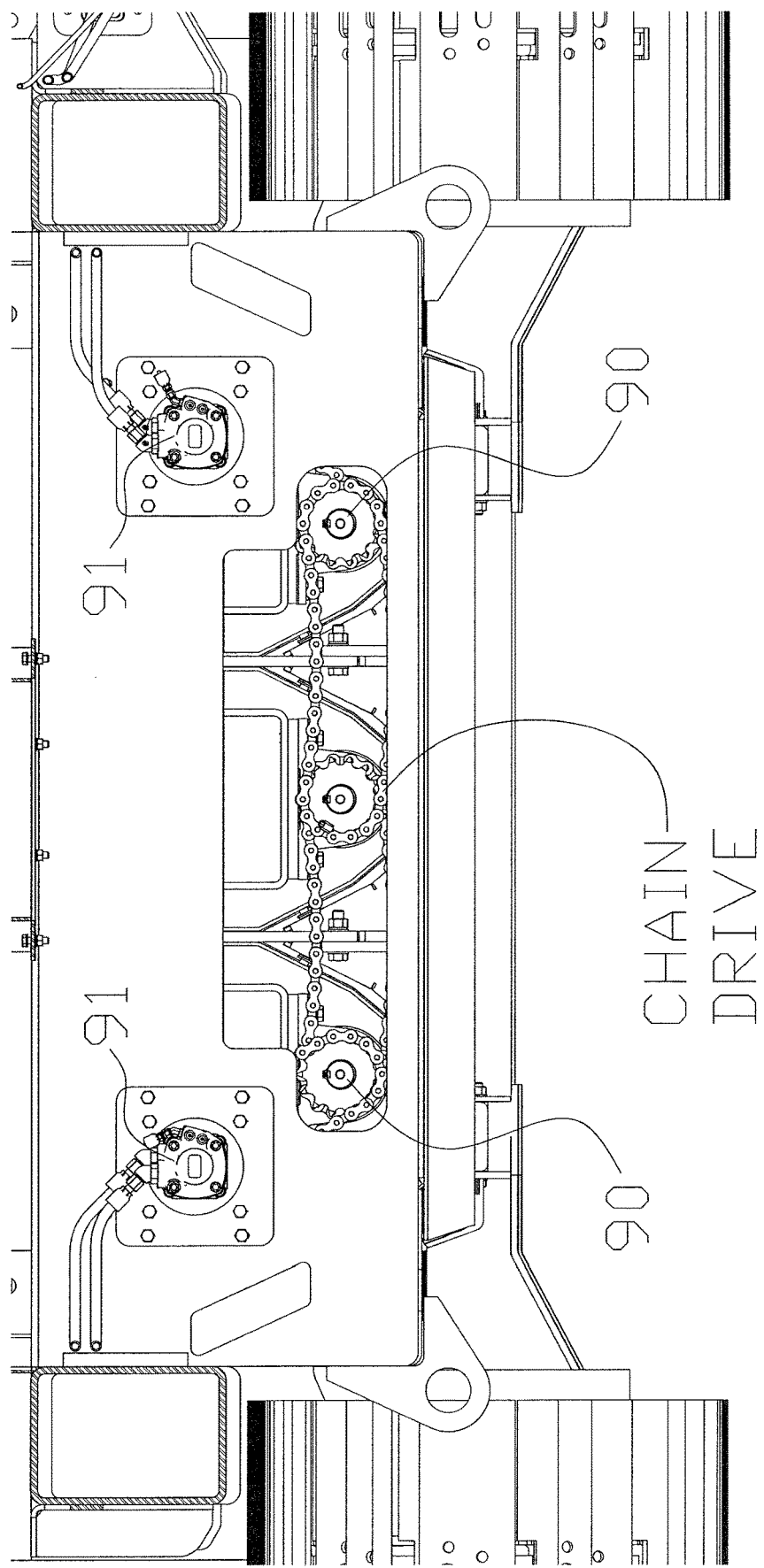
Figure 13:
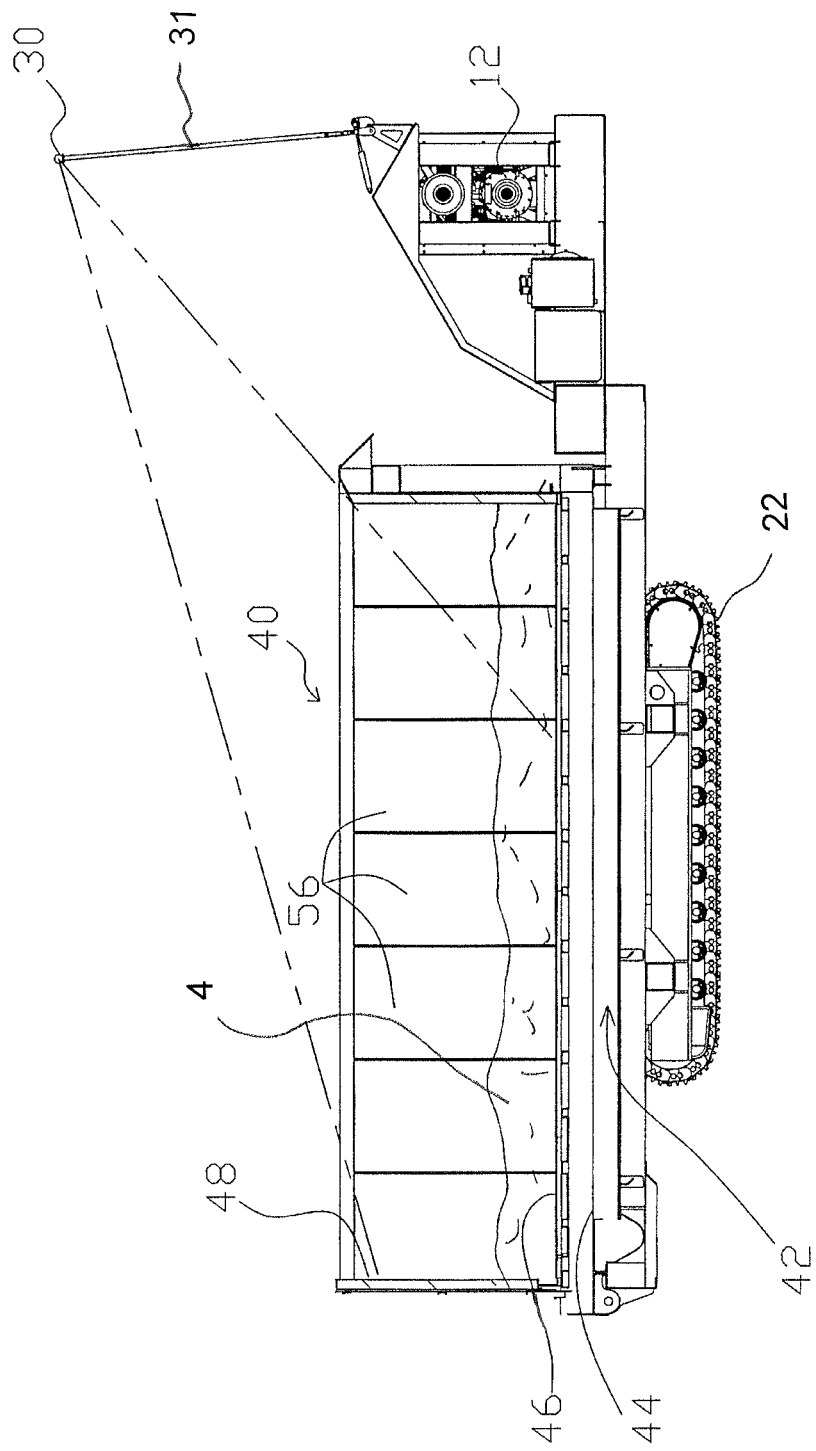
Figure 14:
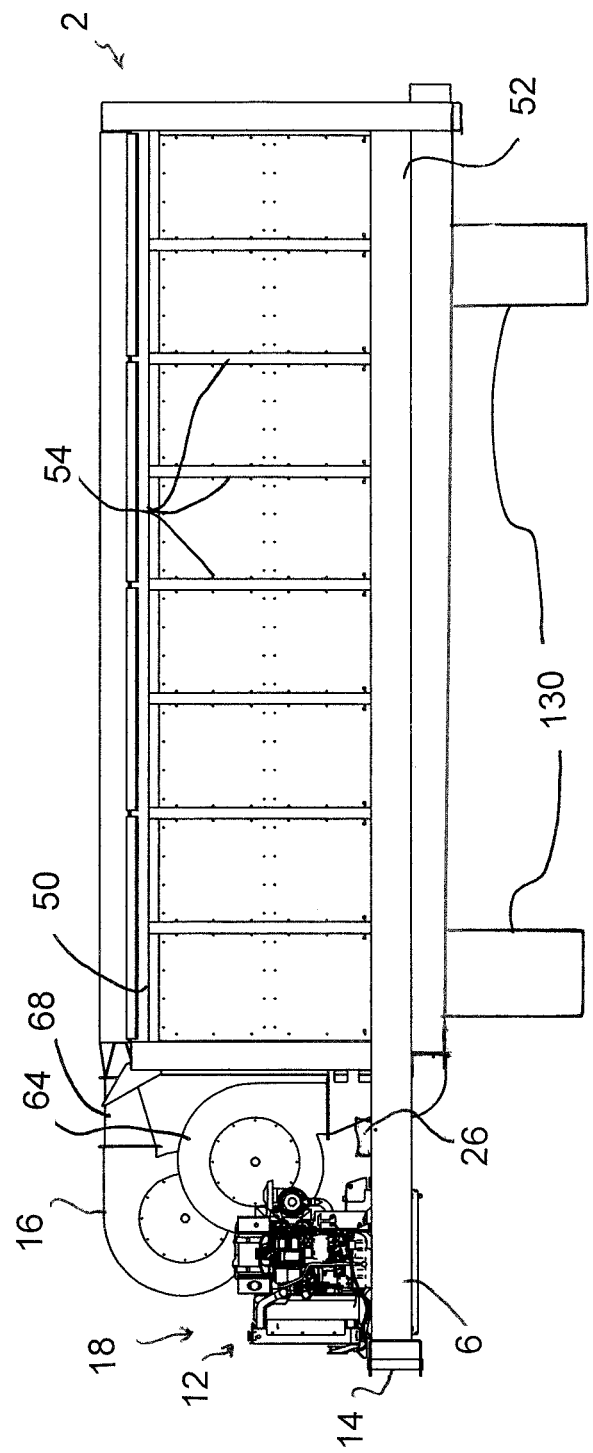

FIG. 7A is a diagrammatic cross-sectional view, taken along section line 7A-7A of FIG. 7, showing the flow of the heated secondary air into the char collection/transfer chamber and through the perforated grate and into the combustion/pyrolization chamber and water, e.g., the heat conductive medium, being supplied to one end of each of the hollow auger shafts for distribution by the auger shaft to assist with both quenching and conveying of the char and boichar out of the char collection/transfer chamber;

FIG. 8 is a diagrammatic top plan view of the char collection/transfer chamber, without any augers located within the char collection/transfer chamber, diagrammatically showing the flow of the secondary air, in dashed lines, flowing within the air plenum chamber located below the char collection/transfer chamber;

FIG. 8A is a diagrammatic cross-sectional view, taken along section line 8A-8A of FIG. 8, showing the flow of the heated secondary air into the char collection/transfer chamber and through the perforated grate and into the combustion/pyrolization chamber with a heat conductive medium being supplied to the leading end of each trough for both quenching and conveying of the char and boichar out of the char collection/transfer chamber;

FIG. 9 is a top plan view of a further embodiment of the portable combustion/pyrolization system, similar to FIG. 5, which is equipped with a heat exchanger for recovering some of the heat generated by combustion/pyrolization of the feed material;

FIG. 10 is a diagrammatic cross sectional view taken along section line 10-10 of FIG. 9 showing the heat exchanger in its engaged position over the combustion/pyrolization chamber;

FIG. 11 is a diagrammatic cross sectional view, similar to FIG. 10, showing the heat exchanger in its retracted position spaced from the combustion/pyrolization chamber;

FIG. 12 is a diagrammatic end view showing the chain drive arrangement for the conveying augers;

FIG. 13 is a diagrammatic cross sectional view of the portable combustion system of FIG. 3 with a viewing device shown in its operative position for viewing combustion of the waste material within the combustion/pyrolization chamber; and FIG. 14 is a diagrammatic view showing a stationary version of the combustion/pyrolization system.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning first to FIGS. 1-5A, a brief description concerning the various components of the present invention will now be briefly discussed. As can be seen in this first embodiment, the present invention relates to a self propelled portable (or possibly a stationary—see FIG. 14) combustion/pyrolization system 2 which can be easily and readily transported to a desired location or site and set up in order to facilitate partial or substantially complete combustion/pyrolization of the desired feed material 4, e.g., all types of material such forestry debris, vegetative debris, biomass, processed and unprocessed wood, chips, bark, ground wood and well as other materials such municipal solid waste (MSW). The portable combustion/pyrolization system 2 comprises a base frame 6 upon which the components of the system are assembled.

An engine 12 (see FIGS. 1, 5 and 13), e.g., a 50-150 horsepower diesel powered engine or possibly a plurality of electric motors, is supported on the base frame 6, in a conventional manner, typically adjacent a leading first end 14 of the portable combustion/pyrolization system 2. An output shaft of the engine 12 drives a hydraulic pump (not shown in detail) which pumps hydraulic fluid and thus generates a source of hydraulic pressure 18 for controlling various operations of the portable combustion/pyrolization system 2, as will be discussed below in further detail.

A conventional first blower 16 is also supported, in a conventional manner, by the base frame 6 adjacent the leading first end 14 of the portable combustion/pyrolization system 2. The blower 16, when driven by the source of hydraulic pressure 18 or possibly directly driven by the engine 12, generates a first flow of combustion air which assists with forming an air curtain and combustion/pyrolization of the feed material 4, and a further discussion concerning such combustion air will follow below.

A drive assembly, e.g., at least first and second sets of drivable wheels or first and second spaced apart and independently drivable tracks 20, 22, is supported by a bottom surface of the base frame 6. Each one of the first and second tracks 20, 22 is supported by a set of conventional sprockets, or some other conventional rotatable components, which facilitate rotation and drive of the respective track 20 or 22 relative to a remainder of the portable combustion/pyrolization system 2. At least one of the sprockets, of each of the first and second tracks 20, 22, is coupled to the source of hydraulic pressure 18 to facilitate supplying hydraulic pressure thereto and rotationally driving that sprocket and the associated track 20 or 22 in a desired rotational direction. As a result of this arrangement, each of the first and second tracks 20, 22 can be independently driven in either a forward or a reverse driving direction as well as at a variety of different rotational speeds to facilitate movement and repositioning of the portable combustion/pyrolization system 2. As such independently drivable tracks 20, 22 are conventional and well known in the art, a further discussion concerning such drive feature is not provided.

The portable combustion/pyrolization system 2 may be equipped with a remote radio controller 24 (see FIG. 1) which wirelessly communicates with a control panel 26 affixed to the base frame 6 of the portable combustion/pyrolization system 2. The control panel 26 controls operation of the engine 12, the pump and the supply of the hydraulic pressure to the drive sprockets of the first and the second endless tracks 20, 22 in order to control forward and reverse travel, turning and/or repositioning of the portable combustion/pyrolization system 2, as required or desired by the operator during operation. As operation of tracked vehicles is conventional and well known in the art, a further detailed description concerning the same is not provided.

It is to be appreciated that the radio controller 24 is generally small enough to be held in the hand of the operator so that the communicated inputted commands, from the operator, are transmitted wirelessly by the radio controller 24 to the control panel 26 which, in turn, controls operation of the portable combustion/pyrolization system 2 and implements the inputted commands. The control panel 26, or possibly the radio controller 24, may also be equipped with a small display 28 to facilitate displaying images received from a viewing device 30 (see FIG. 13), as will be discussed below in further detail.

The base frame 6 of the portable combustion/pyrolization system 2 supports a combustion/pyrolization chamber 40 and a perforated grate 46 forms a bottom surface of the combustion/pyrolization chamber 40 (see FIG. 5, for example). The perforated grate 46 is secured to the base frame 6, e.g., typically by conventional fasteners (not shown in detail), in order to facilitate removal, cleaning, servicing and/or replacement of the perforated grate 46 with another perforated grate 46 having the same, larger or small openings for passage of desired size char and boichar therethrough. The perforated grate 46 is typically fabricated from metal, such as steel or stainless steel, and the grating typically has a thickness of between ⅜ and 4 inches or so and is mounted to a removable grate frame to assist with removal, replacement and/or servicing of the perforated grate 46.

As noted above, the perforated grate 46 is typically removable so as to facilitate replacement, servicing, cleaning and/or changing thereof. The perforated grate 46 typically comprises a rectangular metallic frame upon which one or more replaceable grates are secured by conventional fasteners. The rectangular metallic frame, in turn, is supported by a pair of space apart rails lateral connected to the base frame 6 of the portable combustion/pyrolization system 2. The rectangular metallic frame is typically secured to the pair of space apart lateral rails by one or more conventional fasteners (not shown in detail). In the event that one or more of the grates, forming the perforated grate 46, deteriorate or become sufficiently worn, for example, the perforated grate 46 may be removed from the portable combustion/pyrolization system 2 and the one or more worn grates can thereafter be replaced with one or more new grates. Following replacement of any necessary grates, the perforated grate 46 may then be reinstalled on the pair of space apart rails so that further combustion/pyrolization can then occur within the combustion/pyrolization chamber 40. Alternatively, the grates of the perforated grate 46 may be replaced with a new grates having either smaller or larger openings therein to facilitate passage of either smaller or larger size particles of char and biochar from the combustion/pyrolization chamber 40 into a char collection/transfer chamber 42.

The perforated grate 46 has a plurality of spaced apart small openings, holes or apertures (not labeled) formed therein, e.g., 1/16 to 4 inches holes (see FIG. 2), typically about ⅛-2 inch holes, which facilitate the smaller particles of char, biochar, ash, clinkers, soot, unburnt debris, etc., 36 falling through the perforated grate 46 and collecting on a top surface of the chamber plate 44 located vertically below the combustion/pyrolization chamber 40 while the larger particles of ash and the larger char, biochar, clinkers, soot, unburnt debris, etc., 38 are prevented from passing through and accumulate on the top surface of perforated grate 46. The small openings, holes or apertures, formed in the perforated grate 46, also facilitate the supply of secondary combustion air up through plurality of equally spaced small openings, holes or apertures into the combustion/pyrolization chamber 40, as will be described below in further detail.

The chamber plate 44 extends along and forms a bottom surface of a char collection/transfer chamber 42 (see FIGS. 6A, 7A and 8A) while the perforated grate 46 is spaced from and located vertically above the chamber plate 44 of the char collection/transfer chamber 42 and extends generally parallel thereto. The chamber pate 44 is secured to the base frame 6, e.g., by welding or conventional fasteners. The chamber plate 44 is typically fabricated from metal, such as steel or stainless steel, and has a thickness of between ⅛ and ½ inches or so.

As shown in these Figures, the chamber plate 44 of the char collection/transfer chamber 42 is shaped so as to form a plurality of parallel troughs 92 (e.g., three or more troughs) which each extend parallel to one another and longitudinally along the length of the char collection/transfer chamber 42. A plurality of hollow conveying augers 90, e.g., three conveying augers (see FIG. 5A), are typically accommodated side-by-side and adjacent one another, each within a respective one of the troughs 92 of the char collection/transfer chamber 42. Each respective trough 92 is typically sized and shape so as to accommodate a respective one of the conveying augers 90, and, as the respective augers 90 rotate in a conveying (counter clockwise) direction, each trough 92 is designed to channel/direct the smaller particles of char, biochar, ash, clinkers, soot, unburnt debris, etc., 36 that pass through the openings or apertures in the perforated grate 46, toward one of the respective troughs and conveying augers 90 for conveyance toward the second trailing end of the portable combustion/pyrolization system 2.

Figure 6A:
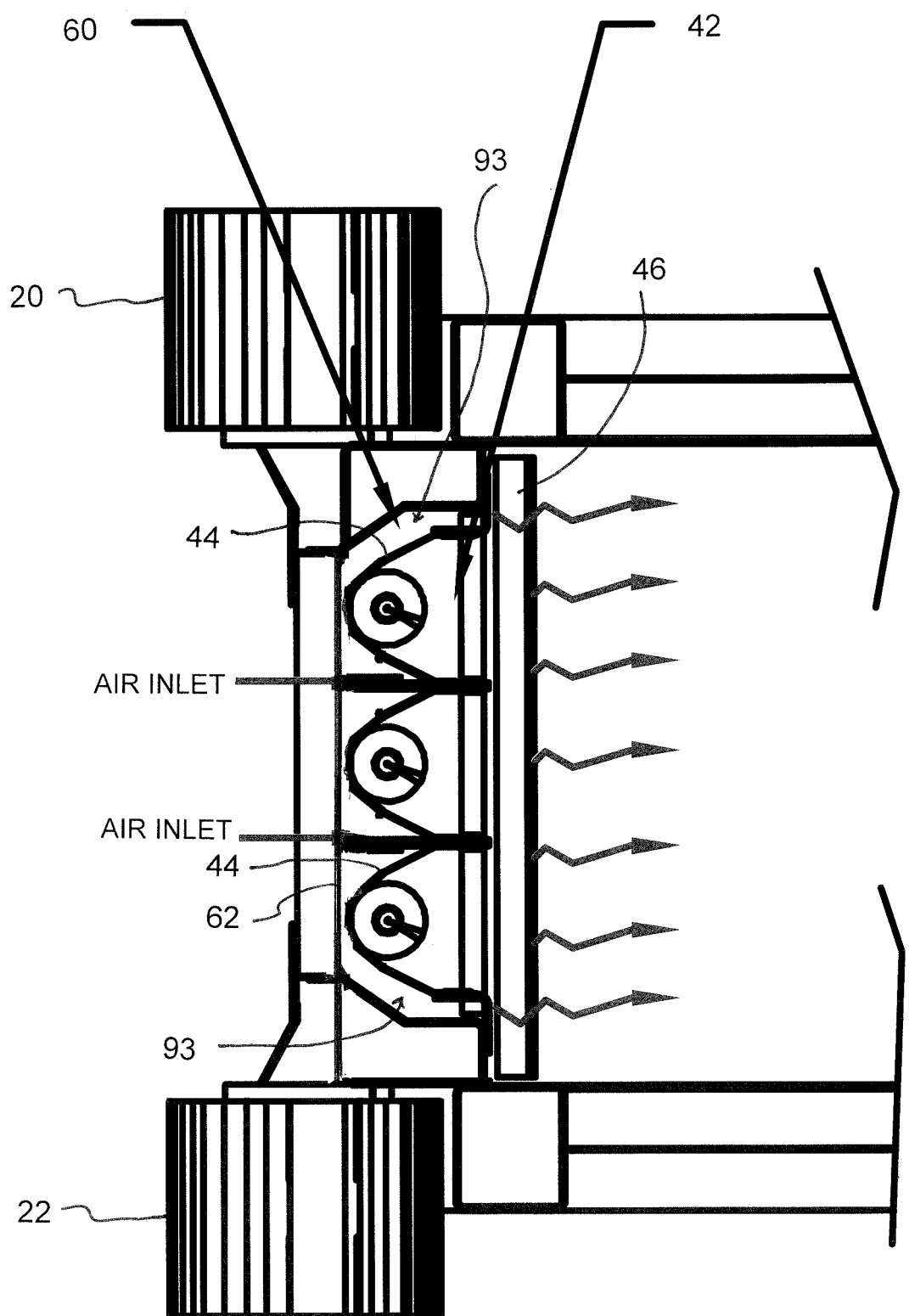
FIG. 6A is a diagrammatic cross-sectional view, taken along section line 6A-6A of FIG. 6, showing the flow of the heated secondary air into the char collection/transfer chamber and through the perforated grate and into the combustion/pyrolization chamber.

As generally shown in FIGS. 6A and 7A, each one of the conveying augers 90 is located adjacent a bottom portion of the respective trough 92. As the conveyed the smaller particles of char, biochar, ash, clinkers, soot, unburnt debris, etc., 36 exits from a discharge end of the char collection/transfer chamber 42, this material is typically discharged out of the char collection/transfer chamber 42 into a collection container and/or some other device 104 to collect the same for further processing of the char and boichar (only diagrammatically shown in FIG. 5B). It is to be appreciated that the discharged the smaller particles of char, biochar, ash, clinkers, soot, unburnt debris, etc., 36 could, if desired, be deposited onto a conveyer or some other transport device to facilitate subsequent processing or handling of thereof, e.g., quenching, adding nutrients thereto, additives thereto, etc.

The conveying augers 90 are driven by one or more hydraulic motors 91 typically by an associated chain drive (see FIG. 12). Alternatively, if desired or required, each one the conveying augers 90 may be individually driven by a hydraulic motor 91. Each one of the hydraulic motors 91, in turn, is connected to the source of hydraulic pressure 18 to receive driving power therefrom and facilitate driving of each one of the hydraulic motors 91 and, in turn, the associated conveying auger 90. Typically, all of the conveying augers 90 rotate at the same time but, if desired or required, the conveying augers 90 may be intermittently driven, depending upon the quantity of the char, biochar, ash, clinkers, soot, unburnt debris, etc., 36 which passes through the perforated grate 46 and accumulates within the char collection/transfer chamber 42.

Each one of the conveying augers 90 is typically a hollow shaft and a supply inlet, coupled to a heat conductive medium source, e.g., a source of water, is connected to one end of each one of the conveying augers 90, e.g., typically the end of the auger opposite the discharge end of the char collection/transfer chamber 42. The heat conductive medium flows, e.g., water, into the inlet and along the length of the conveying auger 90 and the flow of the heat conductive medium is designed to cool the respective conveying auger 90. The heat conductive medium, e.g., water, is also continuously discharged radially out through a plurality of small spray openings formed in and along the length of each one of the conveying augers 90. This discharged heat conductive medium, e.g., water, assist with at least partially extinguishing/quenching the char, biochar, ash, clinkers, soot, unburnt debris which is contained within the char collection/transfer chamber 42.

As shown in the drawings, the char collection/transfer chamber 42 is located directly below the combustion/pyrolization chamber 40. As the smaller particles of char, biochar, ash, clinkers, soot, unburnt debris, etc., 36 pass and fall through the openings or apertures formed in the perforated grate 46, this material falls directly into and collects within one of the troughs 92 of the char collection/transfer chamber 42. As the conveying augers 90 rotate, the conveying augers 90 transport this accumulated char, biochar, ash, clinkers, soot, unburnt debris, etc., 36 along the respective trough 92 toward the trailing end of the char collection/transfer chamber 42. As the smaller particles of char, biochar, ash, clinkers, soot, unburnt debris, etc., 36 are discharged from the char collection/transfer chamber 42, such particles are typically deposited in the collection container and/or some other device 104 to collect the same for processing of the char and boichar. As shown in FIGS. 1 and 5A, the troughs and conveying augers 90 project a small distance out from the portable combustion/pyrolization system 2.

The smaller particles of char, biochar, ash, clinkers, soot, unburnt debris, etc., 36, discharged from the char collection/transfer chamber 42, may then be further suitably quenched and cooled, with additional heat conductive medium, such as water for example, in order to completely extinguish any remaining embers or other materials which are still burning. Thereafter, this completely extinguished material can then be further processed, mixed with fertilizer or additive, transported to another site for further processing, discharged into the soil, etc.

It is to be appreciated that the heat conductive medium, e.g., water, may have one or more conventional additive(s) or nutrient(s) added thereto. For example, the additive may be fertilizer or a pellet binder. It is to be appreciated that the fertilizer may be either added to the heat conductive medium or mixed with the smaller particles of char, biochar, ash, clinkers, soot, unburnt debris, etc., 36 as the same is being discharged, or after discharge, from the char collection/transfer chamber 42. The additive may be a nutrient mixer of nitrogen, phosphorous, potassium, and/or the like. The additives may be used in varying proportions, dependent upon the particular application, in order to provide customized enrichment of the soil.

As shown in FIGS. 5B, 6A, 7A and 8A of the drawings, an air plenum chamber 60 is located vertically below the char collection/transfer chamber 42. The air plenum chamber 60 is the area or space defined between a rear surface of the chamber plate 44 of the char collection/transfer chamber 42 and a top inwardly facing surface of the base plate 62 of the air plenum chamber 60. The base plate 62 of the air plenum chamber 60 is secured to the base frame 6, e.g., by welding or conventional fasteners and forms a bottom most surface of the portable combustion/pyrolization system 2. The base plate 62 of the air plenum chamber 60 is typically fabricated from metal, such as steel or stainless steel, and has a thickness of between ⅛ and ½ inches or so.

A leading end plate (not shown in detail) connects a leading edge of the chamber plate 44 with a leading edge of the base plate 62 of the air plenum chamber 60 to close and seal the leading end of the air plenum chamber 60 while a trailing end plate connects a trailing edge of the chamber plate 44 with a trailing edge of the base plate 62 of the air plenum chamber 60 to close and seal the trailing end of the air plenum chamber 60. At least one inlet (not shown in detail), e.g., typically a pair of spaced apart air supply inlets, are formed in the leading end plate and the air supply inlets supply a source of secondary air, from a secondary air source or blower 64, into the air plenum chamber 60, on either side of the centrally located trough 92 which accommodates a central conveying auger 90. The secondary air source or blower 64 is connected to the air supply inlets (only diagrammatically shown in these drawings), in a conventional manner, for supplying secondary air to the air plenum chamber 60. The secondary air source or blower 64 is typically driven by a hydraulic motor (not shown in detail) which is coupled to and powered by the source of hydraulic pressure 18. It is to be appreciated that the secondary air source or bower 64 may, alternatively, be directly driven by the engine 12.

As generally shown in the drawings, the lower most bottom surface of each one of the troughs 92, located on either side of the central conveying auger 90, is located closely adjacent the base plate 62 of the air plenum chamber 60, e.g., space therefrom by a distance of 0.25 to about 1 inch or so, along the entire length of each respective trough 92. In addition, the base plate 62 is also spaced away from the outwardly facing longitudinal lateral rear surfaces of the two outer most troughs 92 so as to form a pair of air flow passageways 93 out of the air plenum chamber 60. A plurality of secondary air discharge openings (not shown in detail but axially) are formed adjacent and along each lateral longitudinal edge portions of the chamber plate 44 of the char collection/transfer chamber 42 in order to provide a flow path for the heated air to flow from the pair of air flow passageways 93 of the air plenum chamber 60 into the uppermost region of the char collection/transfer chamber 42 (see the two outer most squiggly arrows in FIGS. 6A, 7A and 8A). The secondary air discharge openings, e.g., each opening typically measuring 2 inches by 4 inches, are spaced from one another, e.g., between about 2 feet or so apart from one another, generally along the entire length of each lateral opposed longitudinal side of the air plenum chamber 60.

As the secondary air, from the secondary air source or blower 64, is introduced and flows into the air plenum chamber 60, this secondary air flows between two adjacent troughs 92 and along the rear surface of the chamber plate 44 and thereby cools the troughs 92. This secondary air also, in turn, assists with cooling the conveying auger 90 which is accommodated by the respective trough 92. Due to the relatively close spacing between the bottom surface of the troughs 92, located on either side of the central conveying auger 90, and the base plate 62 of the air plenum chamber 60 as well as the size, location and number of the secondary air discharge openings, the secondary air tends to pressurize slightly the air plenum chamber 60 during operation. Such pressurization tends to assist with more uniform cooling of the entire rear surface of each one of the troughs 92 as well as cooling of the conveying augers 90 accommodated therein. As noted above, the heat conductive medium, e.g., water, flowing in and along the length of the conveying augers also cools the respective conveying auger 90.

This secondary air, after passing between the bottom surface of the trough 92 and the base plate 62 of the air plenum chamber 60, continues to flow both laterally and longitudinally along the rear surface of the outer most troughs 92 and eventually passes through one of air flow passageways 93 and the secondary air discharge openings and into the vertically uppermost region of the char collection/transfer chamber 42 (see the two outer most squiggly arrows in FIGS. 6A, 7A and 8A). As a result of this flow path, the secondary air which flows through the air plenum chamber 60 cools both the troughs 92 and the associated conveying augers 90 and is, in turn, correspondingly heated so that this heated secondary air can, thereafter, eventually flow into the combustion/pyrolization chamber 40 and assist with combustion of the feed material 4 being consumed therein.

As this heated secondary air passes through one of the secondary air discharge openings and enters into the char collection/transfer chamber 42, this heated air is typically dispersed throughout the uppermost region of the char collection/transfer chamber 42 (see the five centrally located squiggly arrows in FIGS. 6A, 7A and 8A). As noted above, this heated air then eventually flows up through one of the openings or apertures, formed in the perforated grate 46, to assist with combustion of the biomass material contained within the combustion/pyrolization chamber 40.

It is to be appreciated that this secondary air flow also assists with cooling the base frame 6 of the as well as other components, e.g., the tracks 20, 22, the source of hydraulic pressure 18, the hydraulic motors 91, the blowers 16, 64, etc., of the portable combustion/pyrolization system 2 so as to prevent the base frame 6 and those other components from overheating, particularly during prolonged operation of the portable combustion/pyrolization system 2.

The base frame 6 comprises upper and lower lateral horizontal supports 50, 52 as well as a plurality of spaced apart vertical supports 54 which are connected to and extend substantially normal between the upper and lower lateral horizontal supports 50, 52. Each one of the vertical supports 54 is spaced from an adjacent vertical support 54. The lateral horizontal supports 50, 52 and the vertical supports 54 form a framework, which is part of the base frame 6, to which various components of the portable combustion/pyrolization system 2 are secured or fastened. A plurality of ceramic members 56 (see FIG. 5B), or some other refractory material, are typically secured, in a conventional manner, to one or more of the horizontal and/or vertical supports 50, 52, 54 of the base frame 6 in a side-by-side abutting relationship, as shown in FIG. 5E, along each of the opposed lateral sidewalls of the base frame 6. Each one of the ceramic members 56 is typically securely but releasably fastened, e.g., by conventional fasteners (not shown in detail), to the one or more horizontal and/or vertical supports 50, 52, 54 of the base frame 6. Such releasable attachment facilitates replacement and/or servicing of one or more of the ceramic members 56, in the event that one of the ceramic members 56 becomes cracked or is otherwise damaged during use.

As shown if FIG. 5B, typically between five and ten, e.g., eight, ceramic members 56 are arranged, side by side and closely adjacent one another, along the second longitudinal sidewall of the combustion/pyrolization chamber 40 of the portable combustion/pyrolization system 2 and additionally between five and ten, e.g., eight, ceramic members 56 are similarly arranged, side by side and adjacent one another, along the opposed first longitudinal sidewall of the combustion/pyrolization chamber 40. Each one of these ceramic members 56, for example, has a height of between 60 and 100 inches, a width of between 30 and 60 inches and a thickness of between 2 and 4 inches.

In addition, a first end fixed ceramic member 58 is releaseably secured to the horizontal and/or vertical supports 50, 52, 54 of the base frame 6 at the first leading end of the combustion/pyrolization chamber 40, to facilitate replacement and/or servicing thereof, while a pair of (or possibly a single) second pivotable (end) ceramic member 48 is pivotably but releaseably secured to horizontal and/or vertical supports 50, 52, 54 of the base frame 6 at the second trailing end of the combustion/pyrolization chamber 40, to facilitate replacement and/or servicing thereof. Each one of the first and the second end ceramic members 58, 48 typically has a height of between 60 and 100 inches, a width of between 30 and 80 inches and a thickness of between 2 and 4 inches.

The second pivotable (end) ceramic member 48, either a pair of members as shown or possibly a single ceramic member, has both a closed position, shown in FIG. 4, as well as an open position (not shown). When the second pivotably (end) ceramic member 48 is in its open position, this position of the second pivotably (end) ceramic member 48 facilitates access to the larger particles of ash and the larger particles of the char, biochar, clinkers, soot, unburnt debris, etc., 38 which have accumulated on the top surface of the perforated grate 46. The larger particles of ash and the larger particles of the char, biochar, clinkers, soot, unburnt debris, etc., 38 can be dragged, pushed, pulled, or otherwise removed from the top surface of the perforated grate 46 so as to dean out the remaining debris contained within the combustion/pyrolization chamber 40. Alternatively, the entire perforated grate 46 can be removed from the combustion/pyrolization chamber 40 to facilitate cleaning of the combustion/pyrolization chamber 40, servicing of the perforated grate 46 or replacement of the perforated grate 46 with a new perforated grate 46 having either smaller or larger holes, as discussed above.

The combustion/pyrolization chamber 40 is defined by the perforated grate 46, the plurality of ceramic members 56 arranged along each one of the first and second longitudinal sideswalls, the first and second (end) ceramic members 58, 48 and an open top which provides access to the combustion/pyrolization chamber 40 and facilitates both the escape of combustion gases therefrom as well as loading of the additional feed material into the combustion/pyrolization chamber 40.

As shown in FIGS. 1, 3 and 5 for example, a coupling 68 interconnects an outlet end of the first blower 16 to an inlet end of a tapered air manifold 72 which is arranged and extends along an upper first longitudinal edge of the combustion/pyrolization chamber 40. The tapered air manifold 72 is secured to an upper horizontal support 50 which extends along the first longitudinal side of the base frame 6.

An internal transverse cross sectional area of the air manifold 72 typically gradually tapers, e.g., via internal baffles, from a larger transverse cross sectional area to a smaller transverse cross sectional area, from the leading first end toward the trailing second end of the base frame 6, where the air manifold 72 terminates. The taper of the air manifold 72 is designed to assist with uniformly discharging the supplied first source of combustion air laterally across the entire open top of the combustion/pyrolization chamber 40 and toward the opposite longitudinal sidewall of the combustion/pyrolization chamber 40, but at a slightly downwardly inclined air flow direction.

The air manifold 72 has a plurality of spaced apart outlets or elongate slits (not shown in detail) along the length thereof which are designed to discharge air completely across the open top of the combustion/pyrolization chamber 40. The first combustion air, exhausting from the plurality of outlets or elongate slits, is discharged so as to form a conventional "air curtain" which extends completely across the open top of the combustion/pyrolization chamber 40, i.e., from the first longitudinal sidewall to the opposed second longitudinal sidewall as well as from the leading first end wall to the trailing second end wall of the combustion/pyrolization chamber 40. This air curtains assists with and substantially prevents the escape of any significant amount of smoke, particulate matter, other air borne debris, etc., from the combustion/pyrolization chamber 40, during combustion, thereby resulting in relatively clean combustion/pyrolization of the feed material 4. As formation of such air curtain conventional and well known in the art, a further discussion concerning the same is not provided.

The first source of combustion air, once that air reaches the opposite side wall of the combustion/pyrolization chamber 40, typically deflects off the sidewall downwardly, due to the slight downwardly inclined air flow direction of the first source of combustion air, and flows toward the bottom portion of the combustion/pyrolization chamber 40 to provide additional combustion air for the feed material 4 combusting/pyrolizing within the combustion/pyrolization chamber 40 and thereby improve the overall combustion/pyrolization of the feed material 4.

It is to be appreciated that a height of the char collection/transfer chamber 42 must be sufficiently in order to permit the secondary combustion air to flow into the upper most region of the char collection transfer chamber 42 and be substantially uniformly distributed to each one of the holes or apertures, formed in the perforated grate 46, and eventually flow into the combustion/pyrolization chamber 40 while still allowing a sufficient amount of the smaller particles of char, biochar, ash, clinkers, soot, unburnt debris, etc., 36 to pass therethrough and collect within and be conveyed by the conveying augers 90 of the char collection/transfer chamber 42.

If desired, the portable combustion/pyrolization system 2 may be equipped with a fuel source 86, e.g., such as one or more refillable propane tanks or refillable tanks containing combustible liquids such as waist oil, spent cooking oil, etc., (see FIG. 5B). One or more nozzles 88 (only one of which is shown in this Figure) are installed within the combustion/pyrolization chamber 40 and each one of the nozzles is connected to the fuel source 86, via a conventional fuel line (not shown in detail), in order to supply fuel thereto. A fuel flow valve (not shown in detail) is located along the fuel line for controlling the flow of fuel from the fuel source 86 to the one or more nozzles 88. At least one of the plurality of nozzles 88, e.g., typically each one of the plurality of nozzles 88, has a conventional igniter (not shown in detail) associated therewith to assist with generating a spark and initiating a flame, when fuel is supplied from the fuel source 86 to the nozzle 88, and thereby ignite the feed material 4 contained within the combustion/pyrolization chamber 40. Since initiating combustion of the feed material 4 within the combustion/pyrolization chamber 40, via the gaseous fuel and the nozzles, is conventional and well known in the art, a further description concerning the same is not provided.

As shown in FIG. 13, the portable combustion/pyrolization system 2 may be equipped with a viewing device 30, such as a camera, which permits viewing of the combustion/pyrolization chamber 40 by an operator. According to one embodiment, the viewing device 30 is attached to a free end of a movable/pivotable stand 31 and the stand 31 is movable from a storage position (not shown) into a deployed position (see FIG. 13), and vice versa. When deployed, the viewing device 30 is able to view and monitor combustion/pyrolization of the feed material 4 within the combustion/pyrolization chamber 40. The viewing device 30 facilitates determining, by an operator, when additional feed material 4 should be added into the combustion/pyrolization chamber 40. As noted above, the radio controller 24 has the small display 28 which wirelessly communicates with the viewing device 30 to permit viewing of combustion, by the operator, as it is occurring within the combustion/pyrolization chamber 40.

Operation of the Portable Combustion/Pyrolization System

The portable combustion/pyrolization system 2 is typically transported to a desired destination in a fully assembled condition. Once the portable combustion/pyrolization system 2 arrives at the desired destination, the operator can operate the radio controller 24, which communicates with the control panel 26, to maneuver the portable combustion/pyrolization system 2 into a desired location and commence combustion of the desired feed material 4.

Next, assuming the portable combustion/pyrolization system 2 is equipped with the optional fuel source 86, the plurality of nozzles 88, and igniter, an operator can then load feed material 4 into the combustion/pyrolization chamber 40 of the portable combustion/pyrolization system 2. Once a sufficient amount of feed material 4 is loaded within the combustion/pyrolization chamber 40, the fuel supply valve is then opened (either by the control panel 26 or manually by the operator) so that fuel is supplied from the fuel source 86 to the one or more of the nozzles 88 and, at the same time, the one or more igniter(s) are activated, by the control panel 26, to generate a flame within the combustion/pyrolization chamber 40. The flow of fuel to the nozzle(s) 88 continues until the feed material 4 is deemed to be sufficiently burning so as to maintain combustion/pyrolization of the feed material 4 contained within the combustion/pyrolization chamber 40. Thereafter, the operator either manually closes, or the control panel 26 automatically closes, the fuel supply valve which thus interrupts the supply of fuel to the nozzle(s) 88. Alternatively, a desired amount of an accelerant, such as diesel fuel or some other readily combustible fuel, is added to the vegetative material and/or biomass and then the accelerant is ignited in order to commence combustion of the vegetative material and/or biomass.

Following continuous combustion of the feed material 4, conventional loading equipment can then be periodically utilized to add additional feed material 4, as necessary, to the combustion/pyrolization chamber 40 via the open top of the combustion/pyrolization chamber 40. This process of periodically feeding additional feed material 4 into the combustion/pyrolization chamber 40 continues until a sufficient amount of the smaller particles of char, biochar, ash, clinkers, soot, unburnt debris, etc., 36 eventually passes through the perforated grate 46 and/or accumulates within the char collection/transfer chamber 42. Once this occurs, the conveying augers 90 are then activated so as to rotate and convey the smaller particles of char, biochar, ash, clinkers, soot, unburnt debris, etc., 36, which pass through the perforated grate 46, along the char collection/transfer chamber 42 and toward the trailing end thereof. As the smaller particles of char, biochar, ash, clinkers, soot, unburnt debris, etc., 36 are discharged from the char collection/transfer chamber 42, the discharged char and biochar is typically deposited into the collection container and/or some other device 104 to collect the same for further processing of the char and boichar.

If desired or required, a heat conductive medium, such as water for example, can be pumped, via a heat conductive medium pump driven by the source of hydraulic pressure 18, and supplied to an inlet end of each one of the hollow conveying augers 90. The heat conductive medium flows along the respective conveying augers 90 and is sprayed or discharged onto the char collection/transfer chamber 42 to assist with partially quenching and/or extinguishing of the smaller particles of char, biochar, ash, clinkers, soot, unburnt debris, etc., 36 which pass through the perforated grate 46 and accumulate within the char collection/transfer chamber 42. The heat conductive medium, e.g., water, is designed to adequately extinguish and quench the smaller particles of char, biochar, ash, clinkers, soot, unburnt debris, etc., 36 located within each one of the troughs 92 of the char collection/transfer chamber 42 as well as cool both the conveying augers 90 and the respective trough 92. The heat conductive medium, e.g., water, also assists the conveying augers 90 with conveying the quenched particles of char, biochar, ash, clinkers, soot, unburnt debris, etc., 36 toward the trailing end of the char collection/transfer chamber 42 and out of the portable combustion/pyrolization system 2 into the collection container and/or some other device 104 for collection and further processing of the char and boichar. The heat conductive medium, e.g., water, is typically supplied at a flow rate of about 0.5 gallons to about 5 gallons per minute per trough 92, for example. It is to be noted that the flow rate of the heat conductive medium can vary from application to application, without departing from the spirit and scope of the present invention. While the heat conductive medium is indicated as only being supplied adjacent leading end of each trough 92, it is to be appreciated that the heat conductive medium may be supplied at variety of other locations along each one of the troughs 92. For example, the heat conductive medium may be supplied to the leading end of each one of the troughs 92, via a heat conductive medium supply line, and the heat conductive medium can then gradually flow along the length of the troughs 92 and assist with conveying the quenched particles of char, biochar, ash, clinkers, soot, unburnt debris, etc., 36 toward the trailing end of the char collection/transfer chamber 42 and out of the portable combustion/pyrolization system 2.

It is noted that as the smaller particles of char, biochar, ash, clinkers, soot, unburnt debris, etc., 36 are extinguished and quenched within the char collection/transfer chamber 42, steam is generated as a byproduct of such extinguishing and/or quenching. This steam is then permitted to pass through the holes or apertures, formed in the perforated grate 46, and flow along with the secondary air into the combustion/pyrolization chamber 40. This steam is then available to contact and bind with small particulate matter, contained within the combustion/pyrolization chamber 40, and thereby assist with minimizing the amount of small particulate matter which is permitted to escape through the open top of the combustion/pyrolization chamber 40. That is, the steam is effective in reducing the overall emissions from the portable combustion/pyrolization system 2 during operation of the portable combustion/pyrolization system 2.

Turning now to FIGS. 8 and 8A, a second embodiment of the present invention will now be described. As this embodiment is very similar to the previously discussed embodiment, only the differences between this second embodiment and the first embodiment will be discussed in detail while identical elements will be given identical reference numerals.

The major difference between the second embodiment and the first embodiment relates to the components of the char collection/transfer chamber 42. According to this embodiment, the conveying augers 90, the hydraulic motors 91 and the associated drive are eliminated and the source of heat conductive medium is utilized for conveying or transporting the smaller particles of char, biochar, ash, clinkers, soot, unburnt debris, etc., 36 which fall into and accumulate within the char collection/transfer chamber 42.

As with the previous embodiment, the bottom plate 44 of the char collection/transfer chamber 42 is still shaped to form a plurality of respective troughs 92 (e.g., three troughs, see FIGS. 8 and 8A), and each trough 92 is designed to channel/direct the char, biochar, ash, clinkers, soot, unburnt debris, etc., 36, that passes through the openings or apertures in the perforated grate 46, toward the bottom portion of the trough for conveyance toward the second trailing end of the portable combustion/pyrolization system 2. According to this embodiment, the bottom plate 44 of the char collection/transfer chamber 42 is preferably manufactured from stainless steel, or some other corrosion resistant material, to facilitate usage with a liquid heat conductive medium, such as water, to quench and convey the char, biochar, ash, clinkers, soot, unburnt debris, etc., 36 within the char collection/transfer chamber 42.

The heat conductive medium is pumped, via a heat conductive medium pump driven by the source of hydraulic pressure 18, or supplied via some other source of water, and typically sprayed or discharged into the char collection/transfer chamber 42, e.g., via the heat conductive medium supply line discharging adjacent the leading end of each one of the troughs 92, to assist with quenching of the char, biochar, ash, clinkers, soot, unburnt debris, etc., 36 which passes through the perforated grate 46 and accumulates within the respective trough 92. As diagrammatically shown, the heat conductive medium may be sprayed or discharge at more than one location in and along a length of the trough 92. The heat conductive medium at least partially extinguishes and quenches the smaller particles of char, biochar, ash, clinkers, soot, unburnt debris, etc., 36 contained within each one of the troughs 92 of the char collection/transfer chamber 42 as well as cools the respective trough 92. The heat conductive medium, as it flows along the bottom portion of the respective trough 92, also conveys the quenched particles of char, biochar, ash, clinkers, soot, unburnt debris, etc., 36 toward the trailing end of the char collection/transfer chamber 42 and eventually out of the char collection/transfer chamber 42. The heat conductive medium is typically supplied to the leading end of each one of the troughs 92 via at least one tube or conduit, e.g., a ½ inch to 2 inch tube or conduit for example, at a flow rate of about 5 gallons to about 25 gallons per minute per trough 92, for example. This flow rate is typically sufficient to both quench the particles of char, biochar, ash, clinkers, soot, unburnt debris, etc., 36 as well as convey the quenched char, biochar, ash, clinkers, soot, unburnt debris, etc., 36 along the respective trough 92 and out of the char collection/transfer chamber 42 of the portable combustion/pyrolization system 2.

In order to assist the quenched char, biochar, ash clinkers, soot, unburnt debris, etc., 36 with being conveyed along the troughs 92, solely by the heat conductive medium and gravity, toward the trailing end of the char collection/transfer chamber 42 and out of the portable combustion/pyrolization system 2, the portable combustion/pyrolization system 2 is typically installed so that the leading end of the char collection/transfer chamber 42 is located at a slightly higher elevation, at least a few inches or so for example, than the trailing end thereof. Such arrangement assists with inducing the heat conductive medium to flow from the leading end toward the trailing end of the portable combustion/pyrolization system 2 and thereby convey the quenched char, biochar, ash, clinkers, soot, unburnt debris, etc., 36 along with the heat conductive medium out of the char collection/transfer chamber 42 and into the collection container and/or some other device 104 for collection and further processing of the char and boichar.

It is to be appreciated that as the particles of char, biochar, ash, clinkers, soot, unburnt debris, etc., 36 are extinguished and quenched within the char collection/transfer chamber 42, steam is generated as a byproduct. Such steam is then permitted to pass through the holes or apertures, formed in the perforated grate 46, along with the heated secondary air and flow into the combustion/pyrolization chamber 40 and, thereafter, bind with any small particulate matter contained therein. As noted above, this steam is effective in reducing the overall emissions from the portable combustion/pyrolization system 2, during operation of the portable combustion/pyrolization system 2.

It is to be appreciated that the heat conductive medium, e.g., water, may have one or more conventional additive(s) or nutrient(s) added thereto. For example, the additive may be fertilizer or a pellet binder. It is to be appreciated that the fertilizer may be either added to the heat conductive medium or mixed with the char, biochar, ash, clinkers, soot, unburnt debris, etc., 36 as the same is being discharged, or following discharge, from the char collection/transfer chamber 42. The additive may be a nutrient mixer of nitrogen, phosphorous, potassium, and/or the like. It is to be appreciated that the additives may be used in varying proportions, dependent upon the particular application, in order to provide customized enrichment of the soil.

It is noted that the conveying augers 90 permit the portable (or stationary) combustion/pyrolization system 2 to be operated for longer periods of time before removal of any larger particles of char, biochar, ash, clinkers, soot, unburnt debris, etc., 38 from the top surface of the perforated grate 46 of the combustion/pyrolization chamber 40 is necessary or required. In addition, the implementation of the conveying augers 90 typically allow the plurality of openings, holes or apertures, formed in the perforated grate 46, to be somewhat larger in size thereby permitting somewhat larger particles of char and biochar to pass therethrough and be conveyed along the troughs 92 of the char collection/transfer chamber 42 toward the second discharge end of the portable combustion/pyrolization system 2 for discharge/processing.

Turning now to FIGS. 9-11, a third embodiment of the present invention will now be described. As this embodiment is very similar to the previously discussed embodiment having the conveying augers 90, only the differences between the third embodiment and the previously discussed embodiments will be discussed in detail while identical elements will be given identical reference numerals.

The major difference between the third embodiment and both of the previously embodiments relates to the additional feature of a heat exchanger 106 provided adjacent the open top of the combustion/pyrolization chamber 40. According to this embodiment, a conventional heat exchanger 106 is located along the second longitudinal side of the combustion/pyrolization chamber 40, opposite the air manifold 72. The heat exchanger 106 has both a retracted position (see FIG. 11) as well as an engaged or active position (see FIG. 10). The retracted position may be utilized when the feeding of feed material 4 into the combustion/pyrolization chamber 40 is occurring or when the water or oil, which is flow through the heat exchanger 106, becomes sufficiently heated or is possibly overheated by the combustion/pyrolization process.

As generally diagrammatically shown in FIG. 9, a source of water or oil 108 is connected, via a flexible or movable inlet conduit or pipe 110, to an inlet end of the heat exchanger 106 while an outlet end of the heat exchanger 106 is connected, via a flexible or movable outlet conduit or pipe 112, to a heat recovery device 114 for removing/recycling the generated heat. The heat recovery device 114 is, in turn, connected to the source of water or oil 108 in order to complete the water or oil flow path. A pump 116 is typically provided to circulate the water or oil from the source of water or oil 108 through the heat exchanger 106, e.g., as shown, the pump 116 may be located between the source of water or oil 108 and the inlet end of the heat exchanger 106. Due to the flexibility of the inlet and the outlet conduits or pipes 110, 112, the heat exchanger 106 is permitted to be moved between its retracted (see FIG. 11) and engaged positions (see FIG. 10), and vice versa.

A second end of the inlet conduit or pipe 110 is connected to an inlet manifold 118 which, in turn, distributes the supplied water or oil to an inlet end of each one of a plurality of heating pipes 120 which extend substantially along the entire length of the combustion/pyrolization chamber 40. As diagrammatically shown in these figures, a total of 25 heating pipes 120 are arranged in a spaced apart relationship substantially parallel with one another. It is to be appreciated that the number of heating pipes 120, as well as the diameter of the heating pipes, can be increased or decreased, depending upon the particular application. An optional protective plate 122 is located on at least a side of the heating pipes 120 facing toward the air manifold 72 in order to protect the heating pipes 120 from becoming inadvertently damaged during operation of the portable combustion/pyrolization system 2, e.g., when additional feed material 4 is being loaded into the combustion/pyrolization chamber 40. Alternatively, in the event that the heating pipes 120, facing toward the air manifold 72, are sufficiently durable, stiff and rough enough this may avoid the need for the protective plate.

The opposite end of each one of the heating pipes 120 is connected to an outlet manifold 124 which collects the heated water or oil, from the plurality of heating pipes, and channels the same into an inlet end of the outlet conduit or pipe 112 for transportation to the heat recovery device 114, such as a turbine for generating electricity, collection of the heat for use in drying an item, utilizing the heat to heat a building, etc.

As diagrammatically shown, the heat exchanger 106 is supported by a plurality of rails, slides, tracks or a pivoting arrangement 126 which extend substantially parallel to, but are located slightly above the open top of the combustion/pyrolization chamber 40. Preferably, a pair of hydraulic cylinders 128 (or possibly a pair of hydraulic motors), connected to the source of hydraulic pressure 18, are utilized for moving the heat exchanger 106 between its retracted and engaged positions, as desired or required.

It is to be appreciated that when the heat conductive medium, e.g., water, is utilized to extinguish and quench the char, biochar, ash, clinkers, soot, unburnt debris, etc., 36, the amount of generated steam is directed related to the amount of the heat conductive medium, e.g., water, added to the char collection/transfer chamber 42. That is, if the operator desires to generate a lot of steam to control emissions from the combustion/pyrolization system 2, then typically a lesser amount of the heat conductive medium, e.g., water, is added to the char collection/transfer chamber 42. However, if the operator desire to generate a smaller amount of steam, then typically an excessive amount of the heat conductive medium, e.g., water, is added to the char collection/transfer chamber 42 so as to minimize the generation of steam.

In the event that the heat exchanger 106 becomes overheated, and the heat exchanger 106 can be moved into its retracted position (FIG. 11) and an optional cooling blower (not shown) can be operated in order to blow cool or ambient air directly at the heating tubes 120 and more rapidly cool the water or oil flowing therethrough.

Turning now to FIG. 14, a brief discussion concern a further embodiment of the combustion/pyrolization system 2 will now be provided. As this embodiment is very similar to the three previously discussed embodiments, only the differences between this embodiment and the previous embodiments will be discussed in detail while identical elements will be given identical reference numerals.

The major difference between this embodiment and the previous embodiments is the replacement of the drive assembly, e.g., at least first and second sets of drivable wheels or first and second spaced apart and independently drivable tracks 20, 22, with a stationary base frame 6, e.g., the base frame 6 is supported by a plurality of spaced apart stationary legs 130. It is to be appreciate that a variety of other support arrangements, other than legs 130, which are well known in the art, would also be readily apparent to those skilled in the art for supporting the combustion/pyrolization system 2, in a stationary manner, without departing from the spirit and scope of the present disclosure. The combustion/pyrolization system 2 of this embodiment operates generally as discussed above except that the combustion/pyrolization system 2 is stationary and thus not readily repositionable.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, I claim:

1. A combustion/pyrolization system comprising:
a base frame;
a combustion/pyrolization chamber being supported by the base frame;
a perforated grate forming a bottom surface of the combustion/pyrolization chamber, and the perforated grate having a plurality of openings formed therein to facilitate passage of at least char and biochar therethrough;
the combustion/pyrolization chamber being open along at a top to facilitate feeding of feed material into the combustion/pyrolization chamber;
an air manifold being coupled to a first blower for supplying a first source of combustion air across the top of the combustion/pyrolization chamber and forming an air curtain during operation of the first blower as well as supplying the first source of combustion air to the combustion/pyrolization chamber;
a char collection/transfer chamber being located below the perforated grate for collecting the at least char and biochar that passes through the perforated grate, and the char collection/transfer chamber having a conveying mechanism for transferring at least the char and biochar out of the combustion/pyrolization system for collection;
an air plenum chamber being coupled to a second blower for supplying pressurized secondary air to the char collection/transfer chamber, the secondary air being heated as the secondary air flows through and cools the char collection/transfer chamber, and the heated secondary air eventually flows into the char collection/transfer chamber and through the perforated grate thereby providing secondary combustion air for the combustion/pyrolization chamber; and
a viewing device which permits viewing of the combustion/pyrolization chamber by an operator, and the viewing device being attached to a movable stand which is movable from a storage position to a deployed position, and vice versa, and the viewing device, when in the deployed position, facilitates viewing of the combustion/pyrolization chamber.

2. The combustion/pyrolization system according to claim 1, wherein the char collection/transfer chamber is located between the air plenum chamber and the combustion/pyrolization chamber.

3. The combustion/pyrolization system according to claim 1, wherein a base surface of the char collection/transfer chamber is shaped to form a plurality of troughs, each one of the plurality troughs accommodates a respective conveying auger, and each respective trough directs at least the char and biochar, from the combustion/pyrolization chamber, toward the respective conveying auger for conveyance toward a discharge end of the combustion/pyrolization system.

4. The combustion/pyrolization system according to claim 3, wherein a heat conductive medium is supplied to the char collection/transfer chamber to assist with quenching of at least the char and biochar which passes through the perforated grate and accumulates within the char collection/transfer chamber.

5. The combustion/pyrolization system according to claim 1, wherein a base surface of the char collection/transfer chamber is shaped to form a plurality of troughs, and each respective trough directs at least the char and biochar, from the combustion/pyrolization chamber, toward a bottom portion thereof for conveyance toward a discharge end of the char collection/transfer chamber.

6. The combustion/pyrolization system according to claim 5, wherein a heat conductive medium is supplied to the char collection/transfer chamber for at least partially quenching the char and biochar which passes through the perforated grate and accumulates within the char collection/transfer chamber and conveying the char and biochar out the discharge end of the char collection/transfer chamber for further processing.

7. The combustion/pyrolization system according to claim 1, wherein sidewalls of the combustion/pyrolization chamber are defined by a plurality of ceramic members, a first end ceramic member and a movable second end ceramic member, the movable second end ceramic member is movable into a first open position to facilitate removal of accumulated char, biochar, ash, clinkers, soot, unburnt debris from the combustion/pyrolization chamber.

8. The combustion/pyrolization system according to claim 1, wherein the base frame is supported by a drive assembly which facilitates movement of the combustion/pyrolization system, and the drive assembly comprises one of wheels or a pair of drivable tracks which facilitate movement of the combustion/pyrolization system to a desired location.

9. The combustion/pyrolization system according to claim 1, wherein the perforated grate is fabricated from metal and has a thickness of between ⅜ and 4 inches, and the plurality of holes formed in the perforated grate facilitate at least the char and biochar passing through the perforated grate and collection in the char collection/transfer chamber as well as passage of the secondary air through the plurality of holes into the combustion/pyrolization chamber to facilitate combustion of the feed material.

10. The combustion/pyrolization system according to claim 1, wherein an interior of the air manifold gradually tapers internally cross sectional area from a first end of the combustion/pyrolization chamber toward the second end of the combustion/pyrolization chamber where the air manifold terminates.

11. The combustion/pyrolization system according to claim 1, wherein at least one nozzle is installed within the combustion/pyrolization chamber and connected to a fuel source, an igniter is associated with the at least one nozzle to assist with generating a spark and initiating a flame, when fuel is supplied from the fuel source to the at least one nozzle, and thereby ignite the feed material contained within the combustion/pyrolization chamber.

12. The combustion/pyrolization system according to claim 1, wherein a control panel is affixed to the combustion/pyrolization system, and the control panel controls operation of an engine, a pump and a supply of hydraulic pressure to a drive assembly in order to control turning and both forward and reverse travel of the combustion/pyrolization system.

13. The combustion/pyrolization system according to claim 12, wherein a handheld remote radio controller communicates wirelessly with the control panel.

14. The combustion/pyrolization system according to claim 1, wherein an engine is supported on the base frame, the engine drives a hydraulic pump which generates a source of hydraulic pressure for controlling operation of the combustion/pyrolization system.

15. The combustion/pyrolization system according to claim 1, wherein the base frame is supported by a stationary assembly.

\* \* \* \* \*